(12) United States Patent
Feuser et al.

(10) Patent No.: US 8,326,715 B2
(45) Date of Patent: Dec. 4, 2012

(54) METHOD OF CREATING AND TRADING DERIVATIVE INVESTMENT PRODUCTS BASED ON A STATISTICAL PROPERTY REFLECTING THE VARIANCE OF AN UNDERLYING ASSET

(75) Inventors: Daniel Feuser, Chicago, IL (US); Eric Chern, Northbrook, IL (US); Paul Kepes, Chicago, IL (US); Andrew Hall, Chicago, IL (US); Lewis Biscamp, Chicago, IL (US); John C. Hiatt, Jr., Woodridge, IL (US)

(73) Assignees: Chicago Board Operations Exchange, Incorporated, Chicago, IL (US); CTC Trading Group, L.L.C., Chicago, IL (US)

( * ) Notice: Subject to any disclaimer, the term of this patent is extended or adjusted under 35 U.S.C. 154(b) by 587 days.

(21) Appl. No.: 11/122,748

(22) Filed: May 4, 2005

(65) Prior Publication Data

US 2006/0253370 A1    Nov. 9, 2006

(51) Int. Cl.
*G06Q 40/00* (2012.01)
(52) U.S. Cl. .......... 705/35
(58) Field of Classification Search .......... None
See application file for complete search history.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,903,201 A | 2/1990 | Wagner |
| 4,980,826 A | 12/1990 | Wagner |
| 5,038,284 A | 8/1991 | Kramer |
| 5,101,353 A | 3/1992 | Lupien et al. |
| 5,136,501 A | 8/1992 | Silverman et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,315,634 A | 5/1994 | Tanaka et al. |
| 5,557,517 A | 9/1996 | Daughterty, III |
| 5,664,115 A | 9/1997 | Fraser |
| 5,689,652 A | 11/1997 | Lupien et al. |

(Continued)

FOREIGN PATENT DOCUMENTS

EP    0 752 135    2/1999

(Continued)

OTHER PUBLICATIONS

Sulima, Cheryl. "Volatility and Variance Swaps", Capital Market News, Federal Reserve Bank of Chicago. (Mar. 2001).*

(Continued)

*Primary Examiner* — Leland Marcus
(74) *Attorney, Agent, or Firm* — Brinks Hofer Gilson & Lione

(57) ABSTRACT

Methods and systems for creating and trading derivative contracts based on a statistical property reflecting a variance of an underlying asset are disclosed. Typically, an underlying asset is chosen to be a base of a variance derivative and a processor calculates a value of the statistical property reflecting an average volatility of price returns of the underlying asset over a predefined period. A trading facility display device coupled to a trading platform then displays the variance derivative based on the value of the statistical property reflecting the volatility of the underlying asset and the trading facility transmits variance derivative quotes from liquidity providers over at least one dissemination network.

33 Claims, 10 Drawing Sheets

U.S. PATENT DOCUMENTS

| | | |
|---|---|---|
| 5,715,402 A | 2/1998 | Popolo |
| 5,744,877 A | 4/1998 | Owens |
| 5,774,877 A | 6/1998 | Patterson, Jr. et al. |
| 5,787,402 A | 7/1998 | Potter et al. |
| 5,793,301 A | 8/1998 | Patterson, Jr. et al. |
| 5,797,002 A | 8/1998 | Patterson, Jr. et al. |
| 5,809,483 A | 9/1998 | Broka et al. |
| 5,813,009 A | 9/1998 | Johnson et al. |
| 5,819,237 A | 10/1998 | Garman |
| 5,845,266 A | 12/1998 | Lupien et al. |
| 5,873,071 A | 2/1999 | Ferstenberg et al. |
| 5,905,974 A | 5/1999 | Fraser et al. |
| 5,913,202 A | 6/1999 | Motoyama |
| 5,915,209 A | 6/1999 | Lawrence |
| 5,915,245 A | 6/1999 | Patterson, Jr. et al. |
| 5,924,082 A | 7/1999 | Silverman et al. |
| 5,950,176 A | 9/1999 | Keiser et al. |
| 5,950,177 A | 9/1999 | Lupien et al. |
| 5,963,923 A | 10/1999 | Garber |
| 5,970,479 A | 10/1999 | Spepherd |
| 5,978,779 A | 11/1999 | Stein et al. |
| 6,012,046 A | 1/2000 | Lupien et al. |
| 6,014,627 A | 1/2000 | Togher et al. |
| 6,014,643 A | 1/2000 | Minton |
| 6,016,483 A | 1/2000 | Rickard et al. |
| 6,018,722 A | 1/2000 | Ray et al. |
| 6,021,397 A | 2/2000 | Jones et al. |
| 6,035,288 A | 3/2000 | Solomon |
| 6,076,068 A | 6/2000 | DeLapa et al. |
| 6,119,103 A | 9/2000 | Basch et al. |
| 6,195,647 B1 | 2/2001 | Martyn et al. |
| 6,199,050 B1 | 3/2001 | Alaia et al. |
| 6,230,146 B1 | 5/2001 | Alaia et al. |
| 6,247,000 B1 | 6/2001 | Hawkins et al. |
| 6,263,321 B1 | 7/2001 | Daughtery, III |
| 6,266,651 B1 | 7/2001 | Woolston |
| 6,269,346 B1 | 7/2001 | Cristofich et al. |
| 6,272,474 B1 | 8/2001 | Garcia |
| 6,278,982 B1 | 8/2001 | Korhammer et al. |
| 6,282,521 B1 | 8/2001 | Howorka |
| 6,285,989 B1 | 9/2001 | Shoham |
| 6,317,727 B1 | 11/2001 | May |
| 6,317,728 B1 | 11/2001 | Kane |
| 6,321,212 B1 * | 11/2001 | Lange .................. 705/36 R |
| 6,377,940 B2 | 4/2002 | Tilfors et al. |
| 6,405,180 B2 | 6/2002 | Tilfors et al. |
| 6,421,653 B1 | 7/2002 | May |
| 6,493,682 B1 | 12/2002 | Horrigan et al. |
| 6,505,174 B1 | 1/2003 | Keiser et al. |
| 6,505,175 B1 | 1/2003 | Silverman et al. |
| 6,539,362 B1 | 3/2003 | Patterson, Jr. et al. |
| 6,560,580 B1 | 5/2003 | Fraser et al. |
| 6,564,192 B1 | 5/2003 | Kinney, Jr. et al. |
| 6,601,627 B2 | 8/2003 | Kasai et al. |
| 6,618,707 B1 | 9/2003 | Gary |
| 6,647,374 B2 | 11/2003 | Kansal |
| 7,039,610 B2 | 5/2006 | Morano et al. |
| 7,047,218 B1 | 5/2006 | Wallman |
| 7,085,738 B2 | 8/2006 | Tarrant |
| 7,099,839 B2 | 8/2006 | Madoff et al. |
| 7,225,153 B2 | 5/2007 | Lange |
| 7,233,922 B2 | 6/2007 | Asher et al. |
| 7,236,953 B1 | 6/2007 | Cooper et al. |
| 7,246,093 B1 | 7/2007 | Katz |
| 7,260,554 B2 | 8/2007 | Morano et al. |
| 7,296,025 B2 | 11/2007 | Kung et al. |
| 7,333,950 B2 | 2/2008 | Shidler et al. |
| 7,389,264 B2 | 6/2008 | Kemp, II et al. |
| 7,742,972 B2 * | 6/2010 | Lange et al. .................. 705/37 |
| 2002/0002530 A1 | 1/2002 | May |
| 2002/0013760 A1 | 1/2002 | Arora et al. |
| 2002/0019799 A1 | 2/2002 | Ginsberg et al. |
| 2002/0032629 A1 | 3/2002 | Siegel, Jr. et al. |
| 2002/0052816 A1 | 5/2002 | Clenaghan et al. |
| 2002/0082967 A1 | 6/2002 | Kaminsky et al. |
| 2002/0087365 A1 | 7/2002 | Kavanaugh |
| 2002/0099640 A1 | 7/2002 | Lange |
| 2002/0103738 A1 | 8/2002 | Griebel |
| 2002/0128952 A1 | 9/2002 | Melkomian et al. |
| 2002/0138401 A1 | 9/2002 | Allen et al. |
| 2002/0147670 A1 * | 10/2002 | Lange .................. 705/35 |
| 2002/0152152 A1 | 10/2002 | Abdelnur et al. |
| 2002/0156716 A1 | 10/2002 | Adatia |
| 2002/0156718 A1 | 10/2002 | Olsen et al. |
| 2002/0198813 A1 | 12/2002 | Patterson, Jr. et al. |
| 2003/0004858 A1 | 1/2003 | Schmitz et al. |
| 2003/0009411 A1 | 1/2003 | Ram et al. |
| 2003/0018567 A1 | 1/2003 | Flitcroft et al. |
| 2003/0018569 A1 | 1/2003 | Eisenthal et al. |
| 2003/0028462 A1 | 2/2003 | Fuhrman et al. |
| 2003/0028468 A1 | 2/2003 | Wong et al. |
| 2003/0093352 A1 | 5/2003 | Muralidhar et al. |
| 2003/0097319 A1 | 5/2003 | Moldovan et al. |
| 2003/0097325 A1 | 5/2003 | Friesen et al. |
| 2003/0115128 A1 | 6/2003 | Lange et al. |
| 2003/0139998 A1 | 7/2003 | Gilbert et al. |
| 2003/0167175 A1 | 9/2003 | Salom |
| 2003/0172026 A1 | 9/2003 | Tarrant |
| 2003/0177077 A1 | 9/2003 | Norman |
| 2003/0182220 A1 | 9/2003 | Galant |
| 2003/0208430 A1 | 11/2003 | Gershon |
| 2003/0220865 A1 | 11/2003 | Lutnick |
| 2003/0225657 A1 | 12/2003 | Whaley et al. |
| 2003/0225658 A1 | 12/2003 | Whaley |
| 2003/0236738 A1 | 12/2003 | Lange et al. |
| 2004/0019554 A1 | 1/2004 | Merold et al. |
| 2004/0024681 A1 | 2/2004 | Moore et al. |
| 2004/0030630 A1 | 2/2004 | Tilfors et al. |
| 2004/0034587 A1 * | 2/2004 | Amberson et al. .................. 705/36 |
| 2004/0088242 A1 | 5/2004 | Ascher et al. |
| 2004/0103050 A1 | 5/2004 | Long |
| 2004/0111358 A1 * | 6/2004 | Lange et al. .................. 705/37 |
| 2004/0117284 A1 | 6/2004 | Speth |
| 2004/0133439 A1 | 7/2004 | Noetzold et al. |
| 2004/0158520 A1 | 8/2004 | Noh |
| 2004/0199450 A1 | 10/2004 | Johnston et al. |
| 2004/0215538 A1 * | 10/2004 | Smith et al. .................. 705/35 |
| 2004/0236636 A1 | 11/2004 | Lutnick |
| 2004/0267657 A1 | 12/2004 | Hecht |
| 2005/0027643 A1 | 2/2005 | Amaitis et al. |
| 2005/0044019 A1 * | 2/2005 | Novick et al. .................. 705/35 |
| 2005/0049948 A1 | 3/2005 | Fuscone |
| 2005/0097027 A1 | 5/2005 | Kavanaugh |
| 2005/0102214 A1 | 5/2005 | Speth et al. |
| 2005/0125326 A1 | 6/2005 | Nangalia et al. |
| 2005/0144104 A1 | 6/2005 | Kastel |
| 2005/0149428 A1 | 7/2005 | Gooch et al. |
| 2005/0165669 A1 | 7/2005 | Montanaro |
| 2005/0209945 A1 | 9/2005 | Ballow et al. |
| 2005/0216384 A1 | 9/2005 | Partlow et al. |
| 2005/0267833 A1 | 12/2005 | Brodersen |
| 2006/0008016 A1 | 1/2006 | Balakrishnan et al. |
| 2006/0036531 A1 | 2/2006 | Jackson |
| 2006/0100949 A1 | 5/2006 | Whaley et al. |
| 2006/0106700 A1 | 5/2006 | Boren et al. |
| 2006/0106713 A1 | 5/2006 | Tilly et al. |
| 2006/0143099 A1 | 6/2006 | Partlow et al. |
| 2006/0149659 A1 | 7/2006 | Carone et al. |
| 2006/0167788 A1 | 7/2006 | Tilly et al. |
| 2006/0167789 A1 | 7/2006 | Tilly et al. |
| 2006/0253354 A1 | 11/2006 | O'Callahan |
| 2006/0253355 A1 | 11/2006 | Shalen |
| 2006/0253359 A1 | 11/2006 | O'Callahan et al. |
| 2006/0253367 A1 | 11/2006 | O'Callahan et al. |
| 2006/0253368 A1 | 11/2006 | O'Callahan et al. |
| 2006/0253369 A1 | 11/2006 | O'Callahan |
| 2007/0011081 A1 | 1/2007 | Bok |
| 2007/0078740 A1 | 4/2007 | Landle et al. |
| 2007/0106585 A1 | 5/2007 | Miller |
| 2007/0112659 A1 | 5/2007 | Shalen et al. |
| 2007/0172352 A1 | 7/2007 | Chiang |
| 2007/0282758 A1 | 12/2007 | Vischer et al. |
| 2008/0059356 A1 | 3/2008 | Brodsky et al. |
| 2008/0065560 A1 | 3/2008 | Bloom |
| 2008/0120249 A1 | 5/2008 | Hiatt |
| 2008/0120250 A1 | 5/2008 | Hiatt, Jr. |

| | | | |
|---|---|---|---|
| 2008/0154790 | A1 | 6/2008 | Hiatt |
| 2008/0183640 | A1 | 7/2008 | Shalen |
| 2008/0243676 | A1 | 10/2008 | Smith |

FOREIGN PATENT DOCUMENTS

| | | |
|---|---|---|
| EP | 0 952 536 A1 | 10/1999 |
| WO | WO 00/28449 | 5/2000 |
| WO | WO 00/48053 | 8/2000 |
| WO | WO 00/57307 A1 | 9/2000 |
| WO | WO 00/70506 | 11/2000 |
| WO | WO 01/22263 | 3/2001 |
| WO | WO 01/22269 | 3/2001 |
| WO | WO 01/22313 | 3/2001 |
| WO | WO 01/22315 | 3/2001 |
| WO | WO 01/22332 | 3/2001 |
| WO | WO 01/88808 | 11/2001 |
| WO | WO 02/37396 A2 | 5/2002 |
| WO | WO 02/077766 A2 | 10/2002 |

OTHER PUBLICATIONS

Demeterfi, Kresimir, et al., "More Than You Ever Wanted to Know About Volatility Swaps," Goldman Sachs Quantitative Strategies Research Notes, Mar. 1999.

CBOE Futures Exchange letter dated May 17, 2004, to Commodity Futures Trading Commission with accompanying pages containing rules, terms, and conditions for a new product to be traded on the CBOE Futures Exchange, 8 pages.

Press Release article, "CBOE Announces Launch of Futures on VIX: First Tradable Volatility Product Will be Offered on New CBOE Futures Exchange," Sep. 5, 2003, two pages.

SEC Notice, Release No. 34-51107, SR-CBOE-2004-75, Federal Register vol. 70, No. 23, dated Friday, Feb. 4, 2005, pp. 6051-6057.

PCX Plus *The Pacific Exchange*, PCX Plus Overview, Oct. 9, 2003, six pages.

The National Association of Securities Dealer, Inc. "NASD Notice to members" 00-65, Sep. 2000, 5 pages.

Special Study: Payment for Order Flow and Internalization in the Options Markets, www.sec.gov/new/studies/ordpay.htm, printed on Oct. 22, 2001, 39 pages.

Domowitz, Ian, "A taxonomy of automated trade execution systems", 12 Journal of Int'l Money and Finance, p. 607-631, dated 1993.

Evans et al. "The Effects of Electronic Trading System on Open-outcry Commodity Exchange", Social Science 410, Nov. 1998.

Wang, G. et al. "Information Transmission and Electronic Versus Open Outcry Trading Systems: An Intraday Analysis of E-Mini S&P 500 Futures, S&P 500 Index Futures and S&P 500 Cash Index", paper presented in Thailand on Dec. 3-4, 2001.

Tsang, R. "Open outcry and electronic trading in futures exchanges", Bank of Canada Review, Spring 1999, pp. 21-39.

Elind Computers Private LMTD, "Online Global Trading System for Marketplaces", brochure, 2002.

C. Danis, et al. "Alternatives to an Open Outcry Market: An Issue of Supporting Cooperation in a Competitive Situation", IBM TJ Watson Research Center, USA.

Clemens et al., "Segmentation, differentiation, and flexible pricing: Experiences with information technology and segment-tailored strategies", *Journal of Management Information Systems: JMIS*, vol. 11, No. 2, pp. 9-36, Fall 1994.

"Squeezing the poor", *Guardian*, p. 8, Feb. 11, 1997.

"La libre competencia sacude a las electricas", *Actualidad Economica*, p. 18, Sep. 30, 1996.

Souter, Gavin, "Bermuda's reinsurers eager to please", *Business Insurance*, vol. 28, No. 44, p. 77, Oct. 31, 1994.

"The Electronic Component", The Options Institute Online Learning Center, obtained at the internet address: http://www.cboe.com/LearnCenter/cboeeducation/Course_02_02/mod_02_03.html.

E. Clemons et al., "Information Technology and Screen-Based Securities Trading: Pricing the Stock and Pricing the Trade", *Management Science*, vol. 43, No. 12, Dec. 1997.

"The Pandora's Box over autoquotes; Industry Trend or Event", *Wall Street & Technology*, Section No. 3, vol. 13, p. 38; ISSN: 1060-989X, Mar. 1997.

"How is a Trade Executed—Limit Order", *Nasdaq*, dated Mar. 7, 2000, One Page.

S. Cosgrove, "Courting Retail, Institutional Customers, CBOE, AMEX Get Creative", *Knight-Ridder Financial News*, Jan. 29, 1993.

Self-Regulatory Organizations: Proposed Rule Change by the Cincinnati Stock Exchange Relating to Small Order Execution Guaranty, 1985 WL 547562; SEC Release No. 22330, Aug. 15, 1985.

A Monitoring Report On The Operation Of The Cincinnati Stock Exchange National Securities Trading System, U.S. Securities And Exchanges Commission, May 1981.

A Report On The Operation Of The Cincinnati Stock Exchange National Securities Trading System 1978-1981, U.S. Securities And Exchange Commission, Sep. 1982.

CBOT Press Release Entitled "Impressive Project Areg. Provides Extended Opportunity In CBOT Financial Complex", dated Jan. 1995, printed from the Internet at http://web.archive.org/web/19990429192354/finance/wat.ch/SCFOA/bulletin/_0001960.htm on Oct. 31, 2005, 3 pages.

A. Frino et al., Price And Time-Priority Versus Pro-Rata Algorithms In Electronically Traded Futures Markets: Simulation Based Performance Characteristics, Oct. 3, 1998, http://www.sirca.org.au/research/database.html (Document 1998009.pdf).

A. Frino et al., The Liquidity Of Automated Exchanges: New Evidence From Germany Bund Futures, vol. 8, Journal Of International Financial Markets, Institutions And Money, pp. 225-241 (1998).

Self-Regulatory Organization; Chicago Stock Exchange, Inc.; Order Approving Proposed Rule Change Creating The Chicago Match System (59 F.R. 63141) SEC Release No. 34-35030, 1994 SEC LEXIS 3863, Nov. 30, 1994.

A. Sarker et al., "Electronic Trading On Futures Exchanges," Current Issues In Economics And Finance, Federal Reserve Bank Of New York, vol. 4, No. 1, Jan. 1998.

Self-Regulatory Organization; Order Approving Proposed Rule Change and Notice of Filing in Order Granting Accelerated Approval of Amendment No. 2 to the Proposed Rule Change by the Philadelphia Stock Exchange, Inc. Relating to Enhanced Specialist Participation in Parity Options Trades, SEC Release No. 34-35429, 60 F.R. 12802, Mar. 8, 1995.

CBOE Rules, CCH (1989) (Rules 6.45-8.80).

CBOE Information Circular IC 93-88 (Nov. 18, 1993).

U.S. Congress, Office of Technology Assessment, "Electronic Bulls and Bears: U.S. Securities Markets and Information Technology", OTA-CIT-469 (Washington, DC: U.S. Government Printing Office, Sep. 1990). (selected excerpts).

Self-Regulatory Organizations; Filing and Order Granting Accelerated Approval of Proposed Rule Change by the Chicago Board Options Exchange, Inc., Relating to System Modifications to the Retail Automated Execution System, SEC Release No. 34-32879, vol. 58, No. 182, Sep. 22, 1993, 49342-49343.

CBOE Regulatory Circular RG 91-71, Dec. 25, 1991.

Notice of Receipt of Plan Filed Pursuant to Section 11A(a)(3)(B) of the Securities Exchange Act of 1934, 1980 WL 29398, SEC Release No. 34-16519, Jan. 22, 1980, 7 pages.

New York Stock Exchange Constitution and Rules (Commerce Clearing House, Inc. New York Stock Exchange Guide) Jul. 15, 1965, pp. 2644-2645; 2682-2683.

R. Teweles et al., The Stock Market, Fifth Edition, John Wiley & Sons, 1987, pp. 176-181.

J. Meeker, The Work of the Stock Exchange, The Ronald Press Company 1923, pp. 108-109.

CBOE Information Circular IC91-15, Feb. 25, 1991.

"smartRay.com Delivers Stock Quotes and Financial Information to Wireless Devices for Free !", PR Newswire, p. 2870, Dec. 16, 1999.

Glen, Jack D., "Trading and information systems in two emerging stock markets", East Asian Executive Reports, vol. 16 No, 12, pp. 8, 14, Dec. 15, 1994.

Michaels, Jenna, "NASD'S Global Fumble", All Street & Technology, vol. 9 No. 11, pp. 5762, Jul. 1992.

"PHLX Files Rule Changes to Improve Handling Orders on Pace", Securities Week, p. 5, Jul. 17, 1989.

"NYSE Votes to Restrict Computerized Trading", San Jose Mercury News, Feb. 5, 1988.

SEC Notice, Release No. 34-47959, SR-CBOE-2002-05, Federal Register vol. 68, No. 110, dated Monday, Jun. 9, 2003, pp. 34441-34448.

Original Rule Filing and Amendment No. 1 to SR-CBOE-2002-05, Submitted to SEC on Jan. 16, 2002, 17 pages.

Amendment No. 2 to SR-CBOE-2002-05, Submitted to SEC on May 16, 2002, 21 pages.

Amendment No. 3 to SR-CBOE-2002-05, Submitted to SEC on Jan. 15, 2003, 69 pages.

Amendment No. 4 to SR-CBOE-2002-05, Submitted to SEC on Apr. 3, 2003, 71 pages.

Amendment No. 5 to SR-CBOE-2002-05, Submitted to SEC on May 15, 2003, 3 pages.

Amendment No. 6 to SR-CBOE-2002-05, Submitted to SEC on May 30, 2003, 28 pages.

SEC Notice, Release No. 34-39086, SR-PCX-97-18, Federal Register vol. 62, No. 185, dated Wednesday, Sep. 24, 1997, pp. 50036-50048.

Angel, James J., "How Best to Supply Liquidity to a Small-Capitalization Securities Market", Georgetown University, Jul. 15, 1996, 27 pages.

Co-Pending U.S. Appl. No. 60/986,727, filed Nov. 9, 2007.

SEC Notice, Release No. 34-46803, SR-PCX-2002-36, Federal Register vol. 67 No. 222, dated Monday, Nov. 18, 2002, pp. 69580-69592.

SEC Notice, Release No. 34-47676, SR-CBOE-2002-05, Federal Register vol. 68 No. 77, dated Tuesday, Apr. 22, 2003, pp. 19865-19874.

Raithel, Tom, article titled "Major Changes Seen for Exchanges", *Evansville Courier and Press*, Apr. 12, 2000, p. B.6.

Bounds for A Volume Weighted Average Price Option, *A. W. Stace*, Sep. 24, 2004.

Transitions 103, *Transitions Trading* website, retrieved using: www.archive.org Jul. 29, 2004 and Dec. 11, 2004.

Hull, J. and White, A., "The Valuation of Credit Default Swap Options", *Journal of Derivatives*, vol. 10, No. 3, 2003, p. 40.

Duffie, D. and Huang, M., "Swap Rates and Credit Quality", Mar. 31, 1995.

Blahnik, Mike, "Internet Opens Up Trading Frontiers", Star Tribune, Metro Edition, Minneapolis, MN, Retrieved from: http://web.archive.org/web/20040322223904/http://www.trade.com/, dated Jul. 25, 2004.

Bogomolny, Laura,: Wanna Make a Bet?, Canadian Business, Toronto, vol. 77, Iss. 21, Oct. 25 to Nov. 7, 2004.

Sodergreen, John, "Product profile: Economic Derivatives in the Energy Sector", *Futures Industry Magazine*, Jan.-Feb. 2005 issue, retrieved from http://www.futuresindustry/org/fi-magazine-home.asp?v=p&q=1018 on May 20, 2008.

Whaley, Robert. "Return and Rick of CBOE Buy Write Monthly Index", *The Journal of Derivatives*, 2002, pp. 35-42.

Chicago Board of Options Exchange, Inc. Description of the CBOE S & P 500 BuyWrite Index (BXM$^{SM}$), 5 pages, 2004.

Morgan Stanley, "Global Medium-Term Notes, series F", *Registration statement No. 333-117752*, Securities Commission and Exchange, 2004, pp. 22-26.

Chicago Board of Options Exchange, Inc. The New CBOE Volatility Index, 19 pages, 2003.

Vasiliki D. Skintzi, "Implied correlation index: A new measure of diversification", The Journal of Future Markets, Feb. 2005, vol. 25, Iss. 2, pp. 1-3.

U.S. Appl. No. 11/849,835, filed Sep. 4, 2007, entitled "System and Method for Creating and Trading a Derivative Investment Instrument Over a Range of Index Values", Applicant: O'Connell et al.

U.S. Appl. No. 12/112,605, filed Apr. 30, 2008, entitled "System and Method for Creating and Trading a Derivative Investment Instrument Over a Range of Index Values", Applicant: O'Connell et al.

U.S. Appl. No. 12/267,013, filed Nov. 7, 2008, entitled "Method and System for Creating a Volatility Benchmark Index", Applicant: Catherine T. Shalen.

Devore, Jay L., "Probability and Statistics for Engineering and the Sciences, Second Edition", Published 1987 by Wadsworth, Inc. pp. 13-16 and 88-96.

The Chicago Board Option Exchange, Exchange Bulletin dated Mar. 13, 1991, vol. 19, No. 11.

\* cited by examiner

| N | Closing Asset Value | R | R² | Sigma(N) | REAL Var | Futures Value | IMPL Var |
|---|---|---|---|---|---|---|---|
| 1 | 1127.02 | -0.0042859 | 1.83693E-05 | 1.83693E-05 | 46.29 | 284.00 | 287.77 |
| 2 | 1122.20 | 0.00630693 | 3.97773E-05 | 5.81466E-05 | 73.26 | 223.00 | 227.83 |
| 3 | 1129.30 | -0.0140359 | 0.000197006 | 0.000255153 | 214.33 | 249.00 | 250.71 |
| 4 | 1113.56 | -0.0046806 | 2.19084E-05 | 0.000277061 | 174.55 | 256.50 | 261.96 |
| 5 | 1108.36 | 0.00157766 | 2.48902E-06 | 0.00027955 | 140.89 | 234.00 | 241.89 |
| 6 | 1110.11 | -0.005954 | 3.54506E-05 | 0.000315001 | 132.30 | 234.00 | 244.52 |
| 7 | 1103.52 | 0.005909 | 3.49162E-05 | 0.000349917 | 125.97 | 214.00 | 224.81 |
| 8 | 1110.06 | 0.00426095 | 1.81557E-05 | 0.000368073 | 115.94 | 198.50 | 210.29 |
| 9 | 1114.80 | -0.0001974 | 3.89527E-08 | 0.000368111 | 103.07 | 198.00 | 213.53 |
| 10 | 1114.58 | 0.01506653 | 0.000227 | 0.000595112 | 149.97 | 180.50 | 186.15 |
| 11 | 1131.50 | 0.00323823 | 1.04862E-05 | 0.000605598 | 138.74 | 184.50 | 194.00 |
| 12 | 1135.17 | -0.000608 | 3.69692E-07 | 0.000605968 | 127.25 | 187.50 | 201.40 |
| 13 | 1134.48 | 0.0066505 | 4.42291E-05 | 0.000650197 | 128.04 | 178.00 | 191.24 |
| 14 | 1142.05 | -0.0100322 | 0.000100645 | 0.000750842 | 135.15 | 201.00 | 219.44 |
| 15 | 1130.65 | -0.0075551 | 5.70797E-05 | 0.000807922 | 135.73 | 212.50 | 236.00 |
| 16 | 1122.14 | 0.00200309 | 4.01237E-06 | 0.000811934 | 127.88 | 199.50 | 223.37 |
| 17 | 1124.39 | -0.0022705 | 5.15504E-06 | 0.000817089 | 121.12 | 199.50 | 227.85 |
| 18 | 1121.84 | -0.0073273 | 5.36891E-05 | 0.000870778 | 121.91 | 211.00 | 245.86 |
| 19 | 1113.65 | -0.0093463 | 8.73535E-05 | 0.000958131 | 127.08 | 221.50 | 261.37 |
| 20 | 1103.29 | 0.00444045 | 1.97176E-05 | 0.000977849 | 123.21 | 203.50 | 240.00 |
| 21 | 1108.20 | 0.00523802 | 2.74368E-05 | 0.001005286 | 120.63 | 184.00 | 214.95 |
| 22 | 1114.02 | -0.0097329 | 9.47284E-05 | 0.001100014 | 126.00 | 193.50 | 228.86 |
| 23 | 1103.23 | 0.00038969 | 1.51857E-07 | 0.001100166 | 120.54 | 186.50 | 223.50 |
| 24 | 1103.66 | 0.00256091 | 6.55828E-06 | 0.001106724 | 116.21 | 175.00 | 210.27 |
| 25 | 1106.49 | -0.0097629 | 9.53144E-05 | 0.001202039 | 121.17 | 194.50 | 241.51 |
| 26 | 1095.74 | -0.00008491 | 7.20974E-07 | 0.001202761 | 116.58 | 201.00 | 258.76 |
| 27 | 1094.81 | 0.01476068 | 0.000217878 | 0.001420637 | 132.59 | 195.00 | 240.54 |
| 28 | 1111.09 | 0.01279701 | 0.000163764 | 0.001584401 | 142.60 | 194.50 | 234.87 |
| 29 | 1125.40 | 0.00181105 | 3.27989E-06 | 0.001587681 | 137.96 | 184.50 | 223.06 |
| 30 | 1127.44 | 0.00244503 | 5.97818E-06 | 0.001593659 | 133.87 | 193.50 | 246.11 |
| 31 | 1130.20 | 0.00027425 | 7.52131E-08 | 0.001593734 | 129.56 | 187.00 | 240.96 |
| 32 | 1130.51 | 2.6536E-05 | 7.04178E-10 | 0.001593735 | 125.51 | 183.00 | 240.49 |
| 33 | 1130.54 | 0.01113595 | 0.000124009 | 0.001717744 | 131.17 | 159.00 | 188.63 |
| 34 | 1143.20 | 0.01602728 | 0.000256874 | 0.001974618 | 146.35 | 166.00 | 188.27 |
| 35 | 1161.67 | 0.00386625 | 1.49479E-05 | 0.001989566 | 143.25 | 163.50 | 187.94 |

| | | | | | |
|---|---|---|---|---|---|
| 36 | 1164.89 | −0.0010982 | 1.20607E-06 | 0.001990772 | 139.35 | 158.50 | 183.12 |
| 37 | 1164.08 | −0.0006956 | 4.83841E-07 | 0.001991256 | 135.62 | 148.50 | 166.15 |
| 38 | 1162.91 | −0.0010056 | 1.01121E-06 | 0.001992267 | 132.12 | 147.50 | 169.98 |
| 39 | 1173.48 | 0.00904821 | 8.18701E-05 | 0.002074137 | 134.02 | 149.00 | 172.37 |
| 40 | 1184.17 | 0.00906841 | 8.22361E-05 | 0.002156373 | 135.85 | 154.00 | 184.25 |
| 41 | 1183.81 | −0.0003041 | 9.24504E-08 | 0.002156466 | 132.54 | 147.50 | 174.17 |
| 42 | 1175.43 | −0.007104 | 5.0467E-05 | 0.002206933 | 132.42 | 145.50 | 170.47 |
| 43 | 1181.94 | 0.00552312 | 3.05048E-05 | 0.002237438 | 131.12 | 145.00 | 173.42 |
| 44 | 1183.55 | 0.00136124 | 1.85298E-06 | 0.002223929 | 128.25 | 140.50 | 167.45 |
| 45 | 1170.34 | −0.0112241 | 0.00012598 | 0.002365271 | 132.46 | 149.00 | 188.17 |
| 46 | 1177.24 | 0.00587841 | 3.45557E-05 | 0.002399826 | 131.47 | 140.00 | 161.80 |
| 47 | 1176.94 | −0.0002549 | 6.49566E-08 | 0.002399891 | 128.68 | 136.00 | 156.24 |
| 48 | 1181.76 | 0.0040887 | 1.67036E-05 | 0.002416595 | 126.87 | 134.50 | 157.39 |
| 49 | 1182.65 | 0.00075283 | 5.66754E-07 | 0.002417162 | 124.31 | 133.00 | 161.39 |
| 50 | 1178.57 | −0.0034558 | 1.19429E-05 | 0.002429105 | 122.43 | 129.00 | 152.46 |
| 51 | 1173.82 | −0.0040385 | 1.63091E-05 | 0.002445414 | 120.83 | 127.50 | 153.67 |
| 52 | 1191.37 | 0.01484052 | 0.000220241 | 0.002665655 | 129.18 | 135.00 | 160.22 |
| 53 | 1190.33 | −0.0008733 | 7.62698E-07 | 0.002666417 | 126.78 | 133.00 | 162.97 |
| 54 | 1191.17 | 0.00070544 | 4.97642E-07 | 0.002666915 | 124.46 | 132.50 | 175.92 |
| 55 | 1190.25 | −0.0007726 | 5.96985E-07 | 0.002667512 | 122.22 | 128.00 | 163.32 |
| 56 | 1177.07 | −0.0111351 | 0.00012399 | 0.002791502 | 125.62 | 132.00 | 176.66 |
| 57 | 1182.81 | 0.00486466 | 2.3665E-05 | 0.002815167 | 124.46 | 128.50 | 161.40 |
| 58 | 1185.24 | 0.00542148 | 2.93925E-05 | 0.002844559 | 123.59 | 126.50 | 154.63 |
| 59 | 1188.00 | −0.0010432 | 1.08832E-06 | 0.002845648 | 121.54 | 123.50 | 146.63 |
| 60 | 1198.68 | 0.00894973 | 8.00977E-05 | 0.002925745 | 122.88 | 124.00 | 140.80 |
| 61 | 1203.38 | 0.00391331 | 1.5314E-05 | 0.002941059 | 121.50 | 122.50 | 142.83 |
| 62 | 1205.72 | 0.00194263 | 3.77383E-06 | 0.002944833 | 119.69 | 119.50 | 113.61 |
| 63 | 1203.21 | −0.0020839 | 4.3427E-06 | 0.002949176 | 117.97 | 117.50 | 87.89 |
| 64 | 1190.45 | −0.0106616 | 0.00011367 | 0.003062845 | 120.60 | | |

| N | Closing Asset Value | R | R² | Sigma(N) | REAL Var | | Futures Value | IMPL Var |
|---|---|---|---|---|---|---|---|---|
| 1 | 1127.02 | | | | | | | |
| 2 | 1122.20 | -0.0042859 | 1.83693E-05 | 1.83693E-05 | 832 → | 46.29 | 284.00 | 287.77 |
| 3 | 1129.30 | 0.00630693 | 3.97773E-05 | 5.81466E-05 | 834 → | 73.26 | 223.00 | 227.83 |
| 4 | 1113.56 | -0.0140359 | 0.000197006 | 0.000255153 | 836 → 214.33 | | 249.00 | 250.71 |
| 5 | 1108.36 | -0.0046806 | 2.19084E-05 | 0.000277061 | 838 → 174.55 | | 256.50 | 261.96 |
| 6 | 1110.11 | 0.00157766 | 2.48902E-06 | 0.00027955 | 808 → 140.89 | | 234.00 | 241.89 |
| 7 | 1103.52 | -0.005954 | 3.54506E-05 | 0.000315001 | | 132.30 | 234.00 | 244.52 |
| 8 | 1110.06 | 0.005909 | 3.49162E-05 | 0.000349917 | | 125.97 | 214.00 | 224.81 |
| 9 | 1114.80 | 0.00426095 | 1.81557E-05 | 0.000368073 | 832 → | 115.94 | 198.50 | 210.29 |
| 10 | 1114.58 | -0.0001974 | 3.89527E-08 | 0.000368111 | 838 → | 103.07 | 198.00 | 213.53 |
| 11 | 1131.50 | 0.01506653 | 0.000227 | 0.000595112 | 810 → | 149.97 | 180.50 | 186.15 |
| 12 | 1135.17 | 0.00323823 | 1.04862E-05 | 0.000605598 | 814 → | 138.74 | 184.50 | 194.00 |
| 13 | 1134.48 | -0.000608 | 3.69692E-07 | 0.000605968 | | 127.25 | 187.50 | 201.40 |
| 14 | 1142.05 | 0.0066505 | 4.42291E-05 | 0.000650197 | | 126.04 | 178.00 | 191.24 |
| 15 | 1130.65 | -0.0100322 | 0.000100645 | 0.000750842 | 814 → | 135.15 | 201.00 | 219.44 |
| 16 | 1122.14 | -0.0075551 | 5.70797E-05 | 0.000807922 | 816 → | 135.73 | 212.50 | 236.00 |
| 17 | 1124.39 | 0.00200309 | 4.01237E-06 | 0.000811934 | | 127.88 | 199.50 | 223.37 |
| 18 | 1121.84 | -0.0022705 | 5.15504E-06 | 0.000817089 | | 121.12 | 199.50 | 227.85 |
| 19 | 1113.65 | -0.0073273 | 5.36891E-05 | 0.000870778 | | 121.91 | 211.00 | 245.86 |
| 20 | 1103.29 | -0.0093463 | 8.7353E-05 | 0.000958131 | | 127.08 | 221.50 | 261.37 |
| 21 | 1108.20 | 0.00444045 | 1.97176E-05 | 0.000977849 | | 123.21 | 203.50 | 240.00 |
| 22 | 1114.02 | 0.00523802 | 2.74368E-05 | 0.001005286 | | 120.63 | 184.00 | 214.95 |
| 23 | 1103.23 | -0.0097329 | 9.47284E-05 | 0.0011000014 | | 126.00 | 193.50 | 228.86 |
| 24 | 1103.66 | 0.00038969 | 1.51857E-07 | 0.001100166 | | 120.54 | 186.50 | 223.50 |
| 25 | 1106.49 | 0.00256091 | 6.55828E-06 | 0.001106724 | 840 → | 116.21 | 175.00 | 210.27 |
| 26 | 1095.74 | -0.0097629 | 9.53144E-05 | 0.001202039 | | 121.17 | 194.50 | 241.51 |
| 27 | 1094.81 | -0.0008491 | 7.20974E-07 | 0.00120276 | 842 → | 116.58 | 201.00 | 258.76 |
| 28 | 1111.09 | 0.01476068 | 0.000217878 | 0.001420637 | | 132.59 | 195.00 | 240.54 |
| 29 | 1125.40 | 0.01279701 | 0.000163764 | 0.001584401 | 818 → | 142.60 | 194.50 | 234.87 |
| 30 | 1127.44 | 0.00181105 | 3.27989E-06 | 0.001587681 | 820 → | 137.96 | 184.50 | 223.06 |
| 31 | 1130.20 | 0.00244503 | 5.97818E-06 | 0.001593659 | | 133.87 | 193.50 | 246.11 |
| 32 | 1130.51 | 0.00027425 | 7.52131E-08 | 0.001593734 | | 129.56 | 187.00 | 240.96 |
| 33 | 1130.54 | 2.6536E-05 | 7.04178E-10 | 0.001593735 | | 125.51 | 183.00 | 240.49 |
| 34 | 1143.20 | 0.01113595 | 0.000124009 | 0.001717744 | | 131.17 | 159.00 | 188.63 |
| 35 | 1161.67 | 0.01602728 | 0.000256874 | 0.001974618 | 822 → 146.35 | | 166.00 | 188.27 |
| | 1166.17 | 0.00386625 | 1.49479E-05 | 0.001989566 | 824 → 143.25 | | 163.50 | 187.94 |

*Fermo 9a*

| | | | | | |
|---|---|---|---|---|---|
| 36 | 1164.89 | -0.0010982 | 1.20607E-06 | 0.001990772 | 139.35 |
| 37 | 1164.08 | -0.0006956 | 4.83841E-07 | 0.001991256 | 135.62 |
| 38 | 1162.91 | -0.0010056 | 1.01121E-06 | 0.001992267 | 134.02 |
| 39 | 1173.48 | 0.00904821 | 8.18701E-05 | 0.002074137 | 132.12 |
| 40 | 1184.17 | 0.00906841 | 8.22361E-05 | 0.002156373 | 135.85 |
| 41 | 1183.81 | -0.0003041 | 9.24504E-08 | 0.002156466 | 132.54 |
| 42 | 1175.43 | -0.007104 | 5.0467E-05 | 0.002206933 | 132.42 |
| 43 | 1181.94 | 0.00552312 | 3.05048E-05 | 0.002237438 | 131.12 |
| 44 | 1183.55 | 0.00136124 | 1.85298E-06 | 0.002239929 | 128.25 |
| 45 | 1170.34 | -0.0112241 | 0.00012598 | 0.002365271 | 132.46 |
| 46 | 1177.24 | 0.00587841 | 3.45557E-05 | 0.002399826 | 131.47 |
| 47 | 1176.94 | -0.0002549 | 6.49566E-08 | 0.002399891 | 128.68 |
| 48 | 1181.76 | 0.004087 | 1.67036E-05 | 0.002416595 | 126.87 |
| 49 | 1182.65 | 0.00075283 | 5.66754E-07 | 0.002417162 | 124.31 |
| 50 | 1178.57 | -0.0034558 | 1.19429E-05 | 0.002429105 | 122.43 |
| 51 | 1173.82 | -0.0040385 | 1.63091E-05 | 0.002445414 | 120.83 |
| 52 | 1191.37 | 0.01484052 | 0.000220241 | 0.002665655 | 129.18 |
| 53 | 1190.33 | -0.0008733 | 7.62698E-07 | 0.002666417 | 126.78 |
| 54 | 1191.17 | 0.00070544 | 4.97642E-07 | 0.002666915 | 124.46 |
| 55 | 1190.25 | -0.0007726 | 5.96985E-07 | 0.002667512 | 122.22 |
| 56 | 1177.07 | -0.0111351 | 0.00012399 | 0.002791502 | 125.62 |
| 57 | 1182.81 | 0.00486466 | 2.3665E-05 | 0.002815167 | 124.46 |
| 58 | 1189.24 | 0.00542148 | 2.93925E-05 | 0.002844559 | 123.59 |
| 59 | 1188.00 | -0.0010432 | 1.08832E-06 | 0.002845648 | 121.54 |
| 60 | 1198.68 | 0.00894973 | 8.00977E-05 | 0.002925745 | 122.88 |
| 61 | 1203.38 | 0.00391331 | 1.5314E-05 | 0.002941059 | 121.50 |
| 62 | 1205.72 | 0.00194263 | 3.77383E-06 | 0.002944833 | 119.69 |
| 63 | 1203.21 | -0.0020839 | 4.3427E-06 | 0.002949176 | 117.97 |
| 64 | 1190.45 | -0.0106616 | 0.00011367 | 0.003062845 | 120.60 |

| | |
|---|---|
| 158.50 | 183.12 |
| 148.50 | 166.15 |
| 147.50 | 169.98 |
| 149.00 | 172.37 |
| 154.00 | 184.25 |
| 147.50 | 174.17 |
| 145.50 | 170.47 |
| 145.00 | 173.42 |
| 140.50 | 167.45 |
| 149.00 | 188.17 |
| 140.00 | 161.80 |
| 136.00 | 156.24 |
| 134.50 | 157.39 |
| 133.00 | 161.39 |
| 129.00 | 152.46 |
| 127.50 | 153.67 |
| 135.00 | 160.22 |
| 133.00 | 162.97 |
| 132.50 | 175.92 |
| 128.00 | 163.32 |
| 132.00 | 176.66 |
| 128.50 | 161.40 |
| 126.50 | 154.63 |
| 123.50 | 146.63 |
| 124.00 | 140.80 |
| 122.50 | 142.83 |
| 119.50 | 113.61 |
| 117.50 | 87.89 |

Figure 8b

METHOD OF CREATING AND TRADING DERIVATIVE INVESTMENT PRODUCTS BASED ON A STATISTICAL PROPERTY REFLECTING THE VARIANCE OF AN UNDERLYING ASSET

FIELD OF THE INVENTION

The present invention relates to derivative investment markets. More specifically, this invention relates to aspects of actively disseminating and trading derivatives.

BACKGROUND

A derivative is a financial security whose value is derived in part from a value or characteristic of another security, known as an underlying asset. Two exemplary, well known derivatives are options and futures.

An option is a contract giving a holder of the option a right, but not an obligation, to buy or sell an underlying asset at a specific price on or before a certain date. Generally, a party who purchases an option is referred to as the holder of the option and a party who sells an option is referred to as the writer of the option.

There are generally two types of options: call options and put options. A holder of a call option receives a right to purchase an underlying asset at a specific price, known as the "strike price," such that if the holder exercises the call option, the writer is obligated to deliver the underlying asset to the holder at the strike price. Alternatively, the holder of a put option receives a right to sell an underlying asset at a specific price, referred to as the strike price, such that if the holder exercises the put option, the writer is obligated to purchase the underlying asset at the agreed upon strike price. Thus, the settlement process for an option involves the transfer of funds from the purchaser of the underlying asset to the seller, and the transfer of the underlying asset from the seller of the underlying asset to the purchaser. This type of settlement may be referred to as "in kind" settlement. However, an underlying asset of an option does not need to be tangible, transferable property.

Options may also be based on more abstract market indicators, such as stock indices, interest rates, futures contracts and other derivatives. In these cases, in kind settlement may not be desired, or in kind settlement may not be possible because delivering the underlying asset is not possible. Therefore, cash settlement is employed. Using cash settlement, a holder of an index call option receives the right to "purchase" not the index itself, but rather a cash amount equal to the value of the index multiplied by a multiplier such as $100. Thus, if a holder of an index call option elects to exercise the option, the writer of the option is obligated to pay the holder the difference between the current value of the index and the strike price multiplied by the multiplier. However, the holder of the index will only realize a profit if the current value of the index is greater than the strike price. If the current value of the index is less than or equal to the strike price, the option is worthless due to the fact the holder would realize a loss.

Similar to options contracts, futures contracts may also be based on abstract market indicators. A future is a contract giving a buyer of the future a right to receive delivery of an underlying commodity or asset on a fixed date in the future. Accordingly, a seller of the future contract agrees to deliver the commodity or asset on the specified date for a given price. Typically, the seller will demand a premium over the prevailing market price at the time the contract is made in order to cover the cost of carrying the commodity or asset until the delivery date.

Although futures contracts generally confer an obligation to deliver an underlying asset on a specified delivery date, the actual underlying asset need not ever change hands. Instead, futures contracts may be settled in cash such that to settle a future, the difference between a market price and a contract price is paid by one investor to the other. Again, like options, cash settlement allows futures contracts to be created based on more abstract "assets" such as market indices. Rather than requiring the delivery of a market index (a concept that has no real meaning), or delivery of the individual components that make up the index, at a set price on a given date, index futures can be settled in cash. In this case, the difference between the contract price and the price of the underlying asset (i.e., current value of market index) is exchanged between the investors to settle the contract.

Derivatives such as options and futures may be traded over-the-counter, and/or on other trading facilities such as organized exchanges. In over-the-counter transactions the individual parties to a transaction are free to customize each transaction as they see fit. With trading facility traded derivatives, a clearing corporation stands between the holders and writers of derivatives. The clearing corporation matches buyers and sellers, and settles the trades. Thus, cash or the underlying assets are delivered, when necessary, to the clearing corporation and the clearing corporation disperses the assets as necessary as a consequence of the trades. Typically, such standard derivatives will be listed as different series expiring each month and representing a number of different incremental strike prices. The size of the increment in the strike price will be determined by the rules of the trading facility, and will typically be related to the value of the underlying asset.

While standard derivative contracts may be based on many different types of market indexes or statistical properties of underlying assets, current standard derivative contracts do not provide investors with sufficient tools to hedge against greater than expected or less than expected volatility in an underlying asset. Thus, there is a need for a standard derivative contract based on a statistical property that reflects the volatility of an underlying asset.

BRIEF SUMMARY

Accordingly, the present invention relates to a method of creating and trading derivative contracts based on a statistical property that reflects variance of an underlying asset. In a first aspect, the invention relates to a method of creating derivatives based on the variance of an underlying asset. First, a processor calculates a dynamic value for a statistical property reflecting an average volatility of price returns of the underlying asset over a predefined period. A trading facility display device coupled to a trading platform then displays at least one quote for the variance derivative from a liquidity provider and the trading facility transmits at least one variance derivative quote from the liquidity provider through a dissemination network to at least one market participant.

In a second aspect, the invention relates to a method of creating derivatives based on the variance of an underlying asset. First, an underlying asset is chosen to be a base of a variance derivative. A value for a statistical property reflecting the variance of the underlying asset is calculated based on an average, over a variance calculation period, of a summation of a squared deviation of a daily return of the underlying asset from a previous daily return of the underlying asset.

Each squared deviation of the daily return of the underlying asset that corresponds to a market disruption event is removed. Finally, a trading facility display device coupled to a trading platform displays quotes for the variance derivative from at least one liquidity provider.

In a third aspect, the invention relates to a system for creating and trading derivatives based on the variance of an underlying asset. Typically, the system comprises a variance property module coupled with a communications network, a dissemination module coupled with the variance property module and the communications network, and a trading module coupled with the dissemination module and the communications network.

Generally, the variance property module calculates a realized variance, cumulative realized variance, and implied realized variance of the underlying asset. The variance property module passes the calculated values to the dissemination module, which transmits the calculated values relating to the variance derivative to at least one market participant. The trading module receives buy or sell orders for the variance derivative, executes the buy or sell orders, and passes the result of the buy or sell orders to the dissemination module to transmit the result of the buy or sell order to at least one market participant.

BRIEF DESCRIPTION OF THE DRAWINGS

FIG. 8 is a table showing values for a variance option contract over a variance calculation period.

DETAILED DESCRIPTION OF THE DRAWINGS

Variance derivatives are financial instruments such as futures and option contracts that trade on trading facilities, such as exchanges, whose value is based on the volatility of the value of an underlying asset and not on the return of the underlying asset. Variance of an underlying asset is a measure of the statistical dispersion of the value of the underlying asset. Thus, variance indicates the movement in the value of an underlying asset from trading day to trading day. Typically, variance is computed as the average squared deviation of the value of an underlying asset from an expected value, represented by an average (mean) price return value.

Those skilled in the art will recognize that variance derivatives having features similar to those described herein and statistical properties which reflect the variance of an underlying asset, but which are given labels other than variance derivatives, variance futures, or variance options will nonetheless fall within the scope of the present invention.

Figure 1:
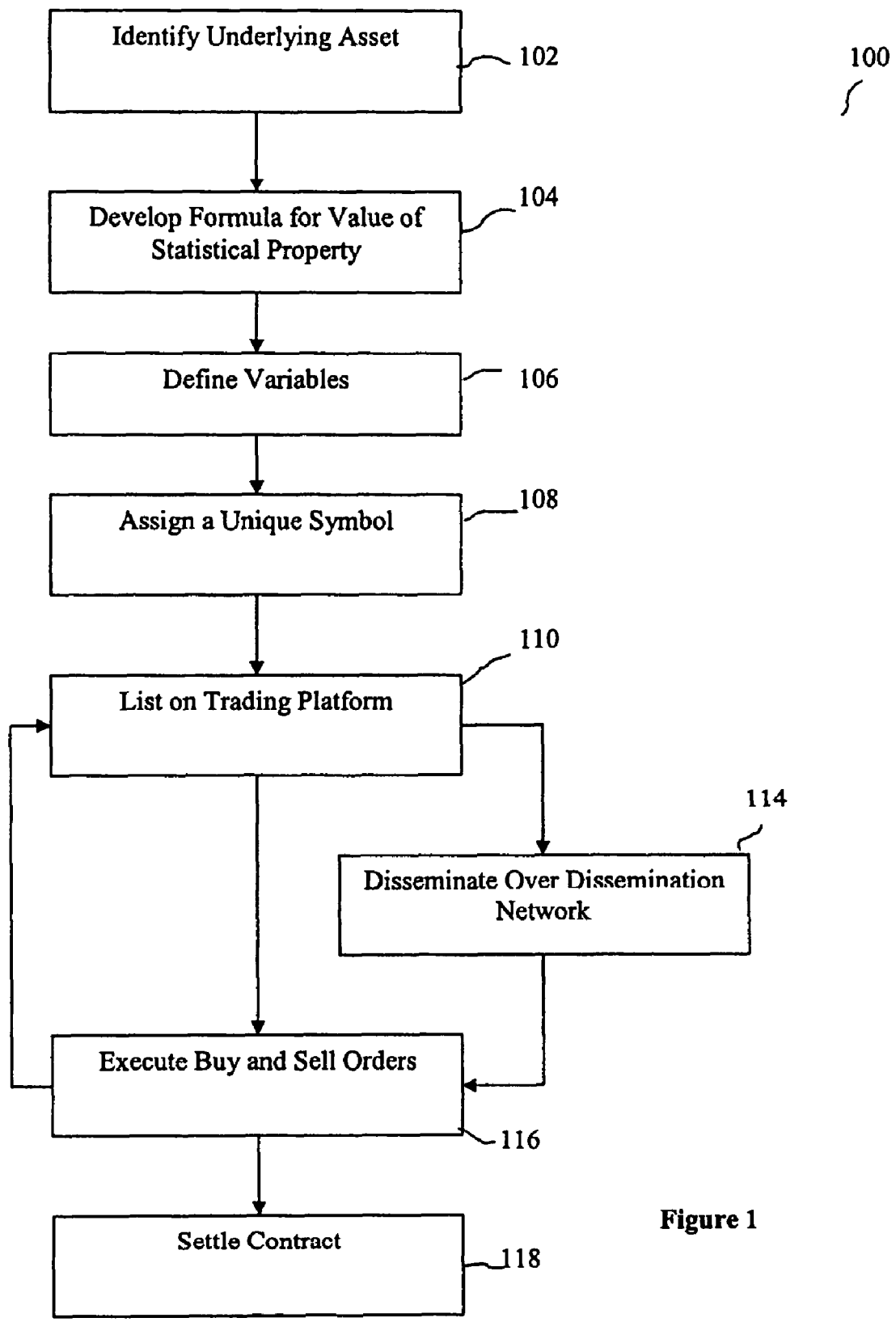
FIG. 1 is a flow chart of a method of creating and trading a variance futures contract.

FIG. 1 is a flow chart of one embodiment of a method for creating and trading a variance futures contract 100. A variance futures contract is a financial instrument in which the realized variance of an underlying asset is calculated at the end of each trading day over a predefined period, known as the variance calculation period. Typically, the realized variance of an underlying asset is calculated using a standardized equation, which is a function of a daily return of the underlying asset. The daily return of an underlying asset is typically the natural log of a final value of the underlying asset over an initial value of the underlying asset.

An investor is generally able to purchase a variance futures contract before a variance calculation period begins, or an investor may trade into or out of a variance futures contract during the variance calculation period. To facilitate the purchase and trading of variance futures contracts, trading facilities such as exchanges like the CBOE Futures Exchange will calculate and disseminate cumulative realized variance and implied realized variance values for a variance futures contract. Cumulative realized variance and implied realized variance provide tools for investors to determine when to trade into and out of a variance futures contract.

The method for creating and trading a variance futures contract begins at step 102 by identifying an underlying asset or a set of underlying assets for the variance futures contract. Typically, an underlying asset or set of assets is selected based on trading volume of a prospective underlying asset, the general level of interest of market participants in a prospective underlying asset, or for any other reason desired by a trading facility. The underlying assets for the variance futures contract may be equity indexes or securities; fixed income indexes or securities; foreign currency exchange rates; interest rates; commodity indexes; commodity or structured products traded on a trading facility or in the over-the-counter ("OTC") market; or any other type of underlying asset whose value may change from day to day.

Once the underlying asset or assets have been selected at 102, a formula is developed at 104 for generating a value for a statistical property reflecting the realized variance of the underlying asset or assets over the defined variance calculation period. In one embodiment, realized variance is calculated using a standard formula that uses an annualization factor and daily S&P 500 returns over the variance calculation period, assuming a mean daily price return of zero. The annualization factor is normally a number that represents the number of days the underlying asset will trade in a year. Typically, the annualization factor is 252 to represent the number of trading days an underlying asset is traded in a year. However, for underlying assets that trade in international trading facilities or specialized trading facilities, the annualization factor may be a value other than 252.

Realized variance is typically calculated according to the formula:

$$\text{Realized Variance} = AF * \sum_{i=1}^{N_a-1} \frac{R_i^2}{N_e - 1},$$

wherein:

$$R_i = \ln \frac{P_{i+1}}{P_i},$$

$P_i$ is an initial value of the underlying asset used to calculate a daily return, $P_{i+1}$ is a final value of the underlying asset used to calculate the daily return, $N_e$ is a number of expected underlying asset values needed to calculate daily returns during the variance calculation period, $N_a$ is an actual number of underlying asset values used to calculate daily returns during the variance calculation period, and AF is the annualization factor.

A "daily return" ($R_i$) is the natural log of a final value ($P_{i+1}$) of an underlying asset over an initial value ($P_i$) of the underlying asset. The initial value ($P_i$) and the final value ($P_{i+1}$) of the underlying asset may be on the same trading day, consecutive trading days, or non-consecutive trading days. For example in one embodiment, the daily return may be the natural log of a closing price of an underlying asset on one day over the closing price of the underling asset on a previous trading day. In another embodiment, the daily return may be the natural log of a closing price of an underlying asset over an opening price of the underlying asset on the same trading day.

The initial value ($P_i$) and final value ($P_{i+1}$) of an underlying asset may be based on a Special Opening Quotation ("SOQ"), closing price, intraday price, or any other price. Similarly, the final value ($P_{i+1}$) of an underlying asset may be based on a SOQ, closing price, intraday price quote, or any other price.

After determining a formula for calculating realized variance at 104, specific values are defined at 106 for the variables within the formula for calculating realized variance during the variance calculation period. Typically, specific values will be defined for an initial value for the first daily return, a final value for the first daily return, an initial value for the last daily return, and the final value of the last daily return. In one embodiment, the initial value ($P_i$) for a first daily return in a variance calculation period is defined to be an initial value of the underlying asset on a first day of the variance calculation period; a final value of the underlying asset for the first daily return is defined to be a closing price value of the underlying asset on a following trading day; an initial value for a last daily return in the variance calculation period is defined to be a closing value of the underlying asset on a trading day immediately prior to the final settlement date; and a final value for the last daily return is defined to be a SOQ on the final settlement date. For all other daily returns, the initial and final values are defined to be the closing values of the underlying asset on consecutive trading days.

Generally, the total number of actual daily returns during the variance calculation period is defined to be $N_a-1$, but if one or more market disruption events occurs during the variance calculation period, the actual number of underlying asset values will be less than the expected number of underlying asset values by an amount equal to the number of market disruption events that occurred during the variance calculation period.

A market disruption event generally occurs on a day on which trading is expected to take place to generate a value for an underlying asset, but for some reason trading is stopped or a value for the underlying asset is not available. In one embodiment, a market disruption event may be defined to be (i) an occurrence or existence, on any trading day during a one-half period that ends at the scheduled close of trading, of any suspension of, or limitation imposed on, trading on the primary trading facility(s) of the companies comprising the underlying asset in one or more securities that comprise 20 percent or more of the level of the asset; or (ii) if on any trading day that one or more primary trading facility(s) determines to change scheduled close of trading by reducing the time for trading on such day, and either no public announcement of such reduction is made by such trading facility or the public announcement of such change is made less than one hour prior to the scheduled close of trading; or (iii) if on any trading day one or more primary trading facility(s) fails to open and if in the case of either (i) or (ii) above, such suspension, limitation, or reduction is deemed material. A scheduled close of trading is the time scheduled by each trading facility, as of the opening for trading in the underlying asset, as the closing time of the trading of such asset on the trading day. Examples of market disruption events include days on which trading is suspended due to a national day of mourning or days on which trading is suspended for national security.

If a trading facility determines that a market disruption event has occurred on a trading day, the daily return of the underlying asset on that day will typically be omitted from the series of daily returns used to calculate the realized variance over the variance calculation period. For each such market disruption event, the actual number of underlying asset values used to calculate daily returns during the settlement calculation, represented by $N_a$, will be reduced by one. Typically, if a market disruption event occurs on a final settlement date of a variance futures contract, the final settlement date may be postponed until the next trading day on which a market disruption event does not occur. Alternatively, any other action may be taken as agreed upon by a trading facility. These actions will typically be listed in the Rules and By-Laws of a clearing agent.

Once the variance calculation period begins for a variance futures contract, the value represented by $N_e$ will not change regardless of the number of market disruption events that occur during the variance calculation period, even if the final settlement date is postponed. Typically, if the final settlement date of the expiring variance futures contract is postponed, the length of the variance calculation period for the next variance futures contract is shortened by the number of market disruption events that occur at the beginning of the variance calculation period. Likewise, the value represented by $N_e$ is reduced by the number of market disruption events that occur at the beginning of the variance calculation period.

Similarly, if a market disruption event occurs at the beginning of the variance calculation period, the first daily return of the shortened variance calculation period for the next variance futures contract will be calculated using the same procedure as described. For example, if the final settlement date for the previous variance calculation period of a variance futures contract is postponed to a Tuesday, the initial value for the first daily return of the variance calculation period of the next variance futures contract would be calculated using the SOQ (or other price designated) of the underlying asset on Tuesday morning and the closing value of the asset the following Wednesday.

Once the underlying asset or assets is chosen at 102, the formula for generating the value of the statistical property reflecting the variance of the underlying asset or assets is determined at 104, and the value of the variables within the variance calculation period are defined at 106, the variance futures contract based on the chosen underlying asset or assets is assigned a unique symbol at 108 and listed on a trading platform at 110. Generally, the variance futures contract may be assigned any unique symbol that serves as a standard identifier for the type of standardized variance futures contract.

Generally, a variance futures contract may be listed on an electronic platform, an open outcry platform, a hybrid environment that combines the electronic platform and open outcry platform, or any other type of platform known in the art. One example of a hybrid exchange environment is disclosed in U.S. patent application Ser. No. 10/423,201, filed Apr. 24, 2003, the entirety of which is herein incorporated by reference. Additionally, a trading facility such as an exchange may transmit variance futures contract quotes of liquidity providers over dissemination networks 114 to other market participants. Liquidity providers may include Designated Primary Market Makers ("DPM"), market makers, locals, specialists, trading privilege holders, registered traders, members, or any other entity that may provide a trading facility with a quote for a variance derivative. Dissemination Networks may include networks such as the Options Price Reporting Authority ("OPRA"), the CBOE Futures Network, an internet website or email alerts via email communication networks. Market participants may include liquidity providers, brokerage firms, normal investors, or any other entity that subscribes to a dissemination network.

Figure 2:
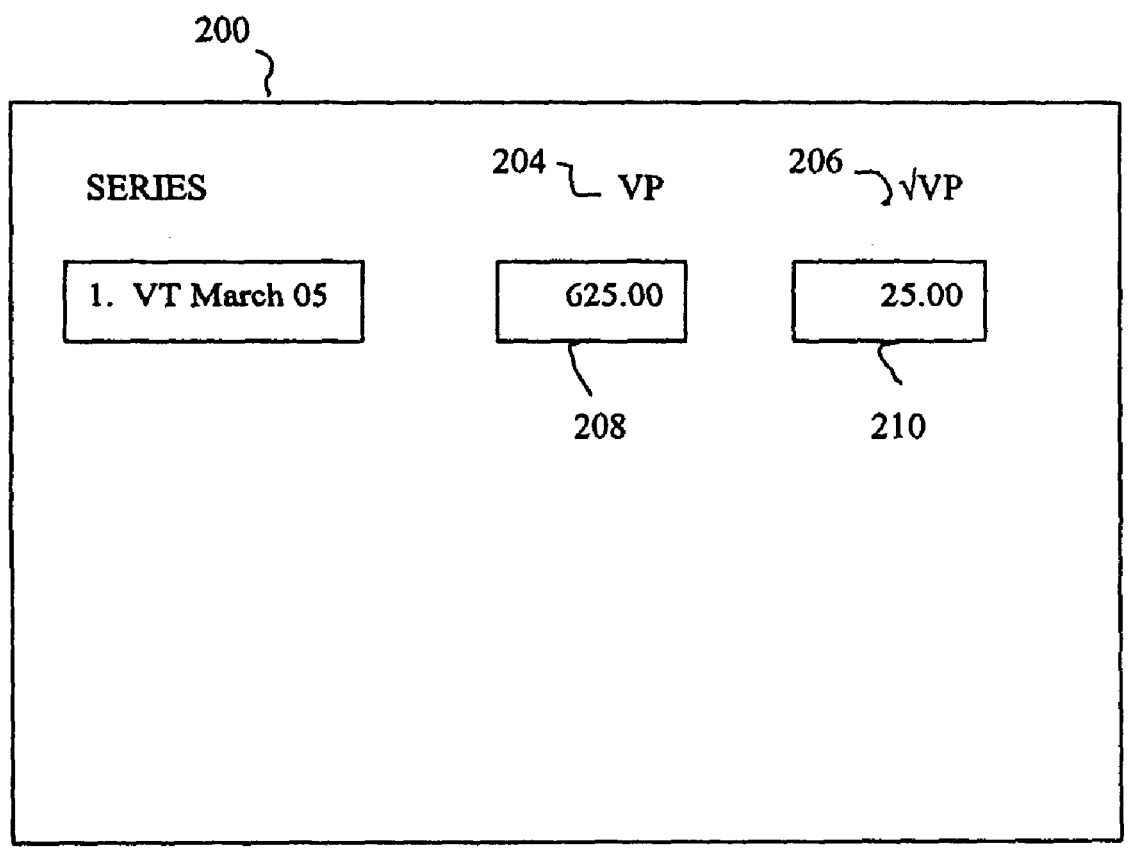
FIG. 2 is a diagram showing a listing of a variance futures contract on a trading facility.

As seen in FIG. 2, in one embodiment the variance futures contracts are listed on a trading platform by displaying the variance futures contracts on a trading facility display device coupled with the trading platform. The listing 200 displays the variance futures contract for purchase in terms of variance points 204 or a square root of variance points 206. A variance point is an expected realized variance over a variance calculation period multiplied by a scaling factor such as 10,000. In FIG. 2, one of the variance futures contract has a value of 625.00 in terms of variance points 208 and a value of 25.00 in terms of volatility 210. A value of 625.0 is calculated by multiplying a realized variance calculation of 0.0625 by a scaling factor of 10,000. Further, a value of 25.00 is calculated by taking the square root of 625.00 (price in terms of variance points).

In addition to listing variance futures contracts in terms of variance points and the square root of variance points, the prices for variance futures contracts may also be stated in terms of a decimal, fractions, or any other numerical representation of a price. Further, scaling factors for the variance derivatives may be determined on a contract-by-contract basis. Scaling factors are typically adjusted to control the size, and therefore the price of a derivative contract.

Over the course of the variance calculation period, in addition to listing variance futures contracts in terms of variance points, the trading facility may also display and disseminate a cumulative realized variance and an implied realized variance on a daily basis, or in real-time, to facilitate trading within the variance futures contract. Cumulative realized variance is an average rate of the realized variance of a variance futures contract through a specific date of the variance calculation period. Thus, using the formula described above, after $N_p$ days in a variance calculation period, the cumulative realized variance may be calculated according to the formula:

$$\text{Cumulative Variance} = AF * \sum_{i=1}^{N_P} \frac{R_i^2}{N_P}.$$

Implied realized variance is a weighted average of both the cumulative realized variance and a most, recent closing price of a variance futures contract during the variance calculation period. Specifically, implied realized variance is calculated according to the formula:

$$\text{Implied Variance} = \frac{TP - RV * \frac{Day_{Current}}{Day_{Total}}}{Day_{Left} / Day_{Total}},$$

where TP is the last trading price of the variance futures contract; RV is the cumulative realized variance; $Day_{Current}$ is the total number of trading days that have passed in the variance calculation period; $Day_{Total}$ is the total number of trading days in the variance calculation period; and $Day_{Left}$ is the number of trading days left in the variance calculation period. Referring to FIG. 1, the cumulative realized variance and implied realized variance values provide investors a tool for determining when to trade into and out of variance futures contracts at 116.

At expiration of the variance calculation period for a variance futures contract, the trading facility will settle a variance futures contract at 118 such that the settlement value is equal to the cumulative realized variance over the specified variance calculation period. Typically, settlement of variance futures contracts will result in the delivery of a cash settlement amount on the business day immediately following the settlement date. The cash settlement amount on the final settlement date shall be the final mark to market amount against the final settlement price of the variance futures contract multiplied by the contract multiplier.

Figure 3:
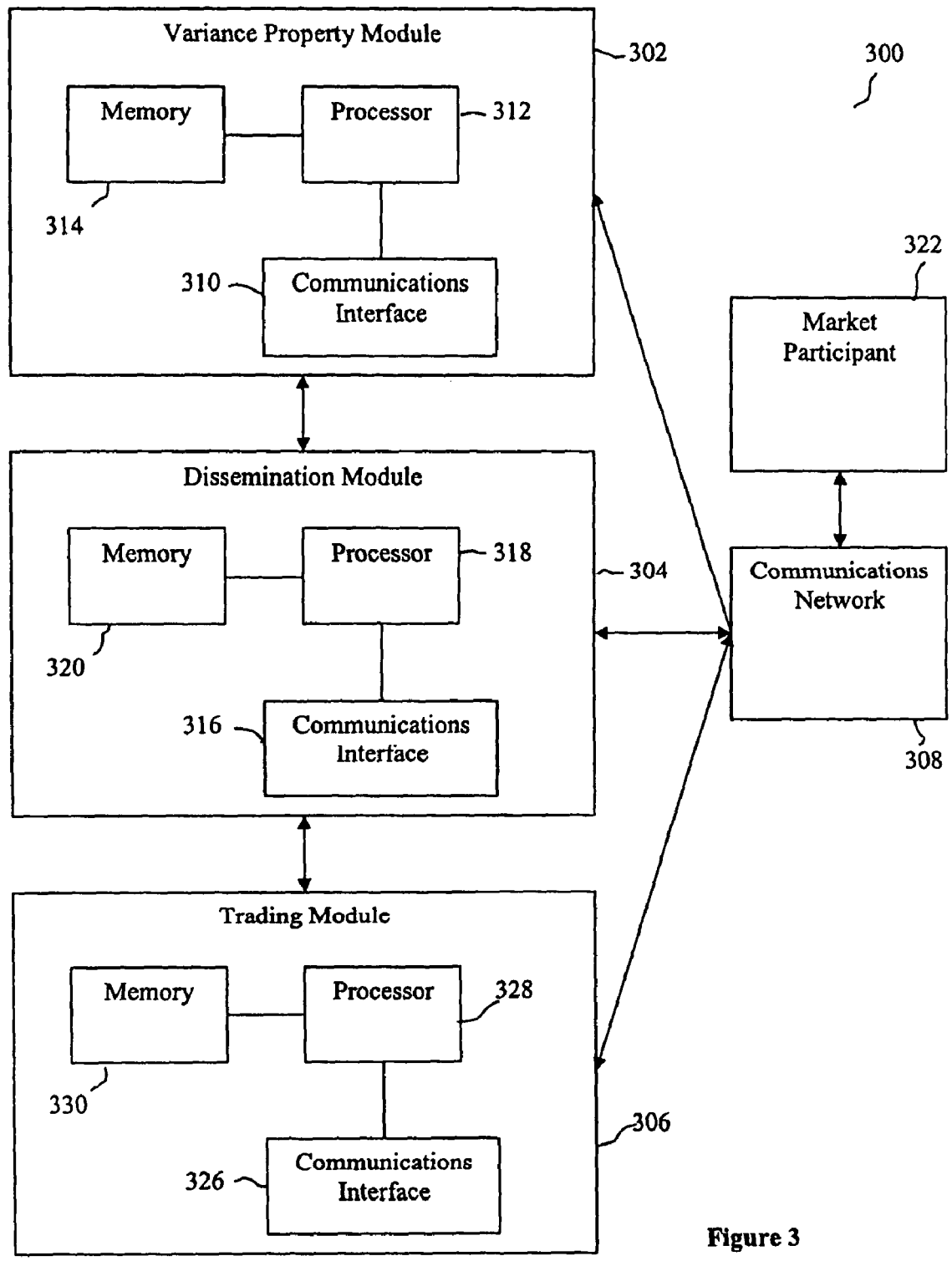
FIG. 3 is a block diagram of a system for creating and trading variance futures contracts.

FIG. 3 is a block diagram of a system 300 for creating and trading variance futures contracts. Generally, the system comprises a variance property module 302, a dissemination module 304 coupled with the variance property module 302, and a trading module 306 coupled with the dissemination module 304. Typically, each module 302, 304, 306 is also coupled to a communication network 308 coupled to various trading facilities 322 and liquidity providers 324.

The variance property module 302 comprises a communications interface 310, a processor 312 coupled with the communications interface 310, and a memory 314 coupled with the processor 312. Logic stored in the memory 314 is executed by the processor 312 such that that the variance property module 302 may receive current values for an underlying asset of a variance futures contract through the communications interface 310; calculate realized variance, cumulative realized variance, and implied realized variance, as described above, for the underlying asset; and pass the calculated values to the dissemination module 304.

The dissemination module 304 comprises a communications interface 316, a processor 318 coupled with the communications interface 316, and a memory 320 coupled with the processor 318. Logic stored in the memory 320 is executed by the processor 318 such that the dissemination module 304 may receive the calculated values from the variance property module 302 through the communications interface 316, and disseminate the calculated values over the communications network 308 to various market participants 322, as described above.

The trading module 306 comprises a communications interface 326, a processor 328 coupled with the communications interface 326, and a memory 330 coupled with the processor 328. Logic stored in the memory 330 is executed by the processor 328 such that the trading module 306 may receive buy or sell orders over the communications network 308, as described above, and pass the results of the buy or sell order to the dissemination module 304 to be disseminated over the communications network 308 to the market participants 322.

Figure 4B:
FIG. 4 is a table showing values for a variance futures contract over a variance calculation period.

FIG. 4 is a table showing values for a variance futures contract over a variance calculation period. The first column 402 represents the number of days that have passed in the variance calculation period; column 404 shows the daily closing price of the underlying asset; column 406 shows the natural log of the current closing price of the underlying asset over the previous closing price of the underlying asset; column 408 shows the square of the value of column 406; column 410 shows the summation of the values in column 408; column 412 shows the cumulative realized variance on each day; column 414 shows the closing price of the variance futures contract for each day; and column 416 shows the calculated implied realized variance for each day.

As shown in column 402, a variance futures contract with a 90-day variance calculation period typically includes 64 trading days. In the example, on the first trading day 418, the underlying asset closes at a value of 1122.20 (420). To calculate the realized variance for day 1, the natural log is taken of the closing value 420 of the underlying asset on day 1 (1122.20) over the closing value 422 of the underlying asset on the previous trading day (1127.02), resulting in a value of −0.0042859 (424). The value of the natural log is squared, resulting in the value of $1.83693*10^{-5}$ (426). The value of the square of the natural log of the current day's closing price over the previous day's closing price is then summed with any previous values in column 408. Due to the fact there are no previous values on the first day, the summation is equal to $1.83693*10^{-5}$ (428). The value of the summation is then divided by the number of trading days in the variance calculation period that has passed (1) to obtain an average variance over the variance calculation period, multiplied by an annualization factor to represent the number of trading days in a year (252) and multiplied by a scaling factor (10,000), resulting in a value of 46.29 (430).

The realized variance of the variance futures contract after one day can be used with the closing value of the variance futures contract on the first day 432 (284.00) to calculate the implied variance 434 according to the implied realized variance formula described above. Specifically, the implied realized variance is calculated to be:

$$\text{Implied Variance} = \frac{284.00 - 46.29 * \frac{1}{64}}{\frac{63}{64}} = 287.77.$$

This above-described process for the first trading day is repeated for each trading day in the variance calculation period. For example on the $20^{th}$ day of the variance calculation period 436, the underlying asset closes at 1108.20 (438). The natural log is taken of the closing value of the current day 438 (1108.20) over the closing value of the previous closing day 440 (1103.29). The result of the natural log 441 (0.00444045) is squared 442 ($1.97176*10^{-5}$), and summed with the previous values 444 (0.000958131) to obtain a value 446 (0.000977849). The resulting value is divided by the current number of trading days that have passed (20) to obtain an average; multiplied by an annualization factor representing the number of trading days in a year (252); and multiplied by a scaling factor (10,000) to obtain the cumulative realized variance 448 of 123.21 on day 20.

The implied variance of the $20^{th}$ day 452 of the variance calculation period can then be calculated using the closing value of the variance futures contract 450 on the $20^{th}$ day (203.5) according to the formula described above:

$$\text{Implied Variance} = \frac{203.5 - 123.21 * \frac{20}{64}}{\frac{44}{64}} = 240.00$$

In addition to variance futures contracts, variance derivatives also encompass variance option contracts. A variance option contract is a type of option product that has a strike price set at a cumulative realized variance level for an underlying asset. The strike price to be listed may be any variance level chosen by the trading facility.

As with traditional option contracts, a variance option contract may include both call variance options and put variance options. Typically, the holder of a variance call option receives the right to purchase a cash amount equal to the difference between the current value of the statistical property reflecting the variance of the underlying asset and the strike price multiplied by the multiplier. Similarly, the holder of a variance put option receives the right to sell a cash amount equal to the difference between the current value of the statistical property reflecting the variance of the underlying asset and the strike price multiplied by the multiplier.

Due to the fact the variance option contract is based on a statistical property, in kind settlement is not desired and cash settlement is employed. Typically, the cash settlement will be equal to the value of the statistical property reflecting variance of the underlying asset multiplied by a predefined multiplier. Any predefined multiplier may be chosen by the trading facility.

Figure 5:
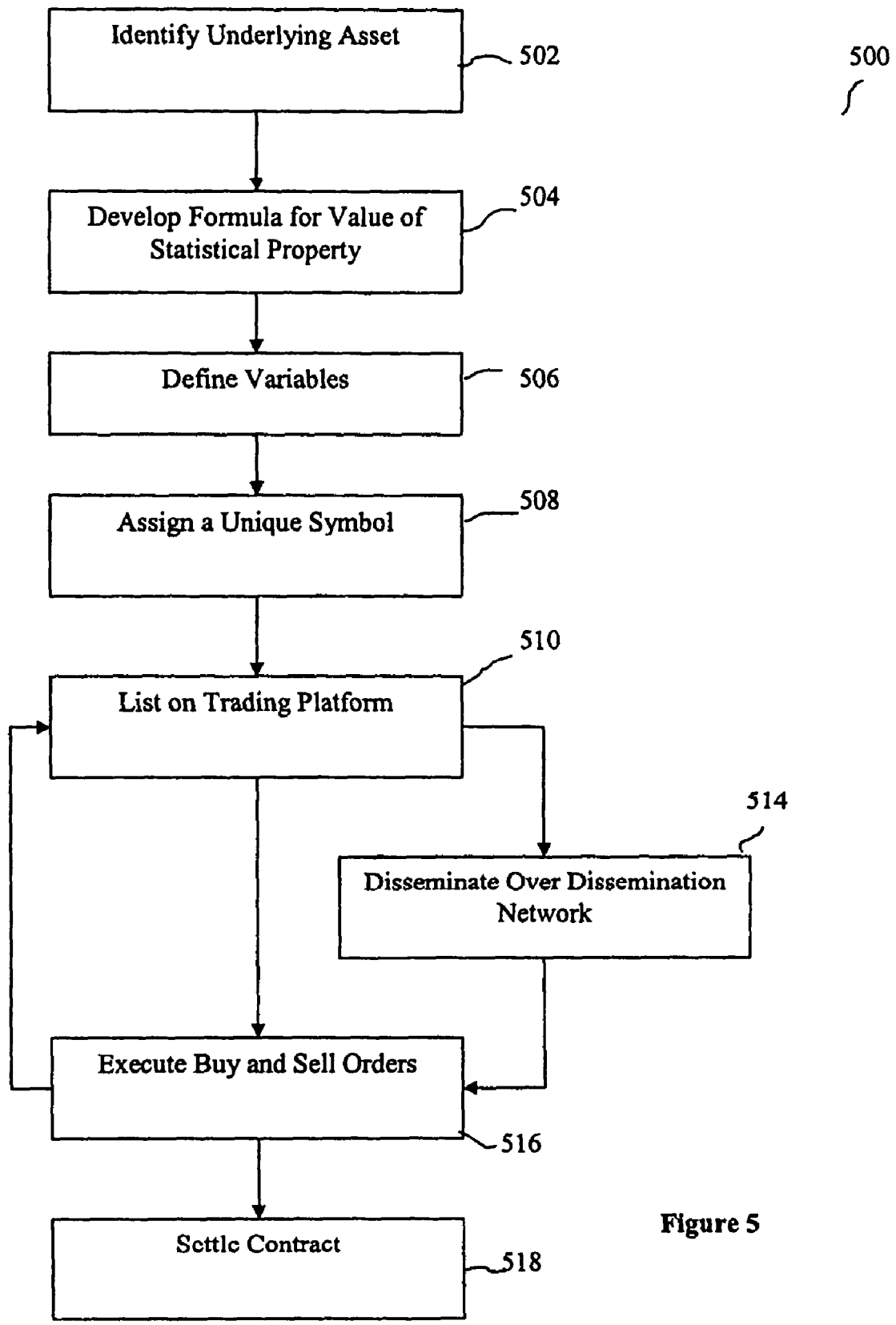
FIG. 5 is a flow chart of a method of creating and trading a variance option contract.

As shown in FIG. 5, to create and trade a variance option contract an underlying asset is first chosen 502. As with the variance futures contract, the underlying asset may be selected based on trading volume of a prospective underlying asset, a general interest in a prospective underlying asset among market participants, or for any other reason desired by a trading facility. The underlying asset for the variance option contract may be equity indexes or securities; equity fixed income indexes or securities; foreign currency exchange rates; interest rates; commodity indexes; commodity or structured products traded on a trading facility or in the over-the-counter ("OTC") market; or any other type of underlying asset known in the art.

Once the underlying asset or assets have been selected at 502, a formula is developed at 504 for generating a value of a statistical property reflecting the realized variance of the underlying asset or assets over the defined variance calculation period. Typically, the formula to generate a value of a statistical property reflecting realized variance for a variance option contract is the same formula used to generate a value of a statistical property reflecting realized variance for the variance futures contract. Specifically, variance for a variance option contract is typically calculated according to the formula:

$$\text{Realized Variance} = AF * \sum_{i=1}^{N_a-1} \frac{R_i^2}{N_e - 1},$$

wherein:

$$R_i = \ln\frac{P_{i+1}}{P_i},$$

$P_i$ is an initial value of the underlying asset used to calculate a daily return, $P_{i+1}$ is a final value of the underlying asset used to calculate the daily return, $N_e$ is a number of expected underlying asset values needed to calculate daily returns during the variance calculation period, $N_a$ is an actual number of underlying asset values used to calculate daily returns during the variance calculation period, and AF is the annualization factor.

As with the variance futures contracts, specific values are defined at 506 for the variables within the formula for calculating realized variance during the variance calculation period. The variance option contract is then assigned a unique symbol at 508 and listed on a trading platform at 510. Generally, the variance option contract may be assigned any unique symbol that serves as a standard identifier for the type of standardized variance options contract.

Generally, a variance option contract may be listed on an electronic platform, an open outcry platform, a hybrid environment that combines the electronic platform and open outcry platform, or any other type of platform known in the art. Additionally, a trading facility may disseminate quotes for variance option contracts over dissemination networks 514 such as the OPRA, the CBOE Network, an internet website or email alerts via email communication networks to market participants.

Figure 6:
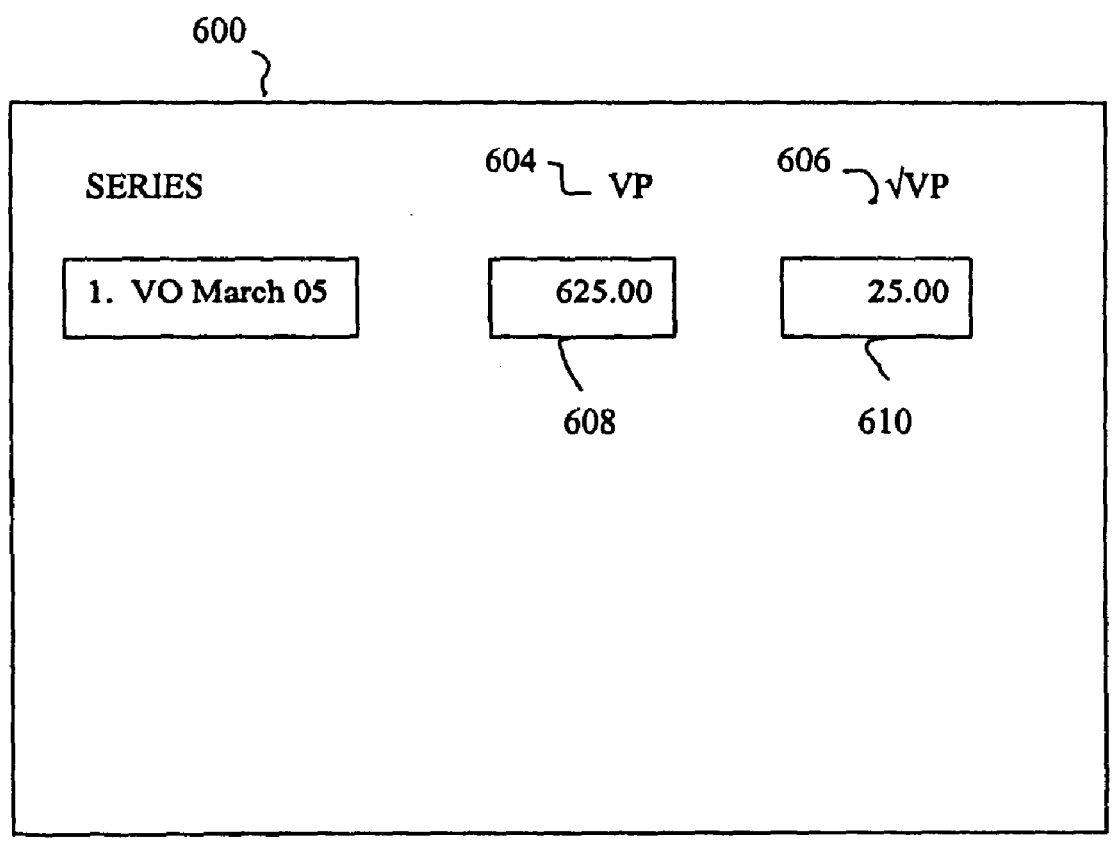
FIG. 6 is a diagram showing a listing of a variance options contract on a trading facility.

As seen in FIG. 6, in one embodiment, similar to variance futures contracts, variance option contracts are listed 600 on a trading platform for purchase with a strike price in terms of variance points 604 or a square root of variance points 606. A variance point is an expected realized variance over a variance calculation period multiplied by a scaling factor such as 10,000.

Referring again to FIG. 5, after a variance option contract is listed on a trading facility, an investor may trade into or out of the option contract at 516 as is well known in the art, until the option contract expires at 518.

Figure 7:
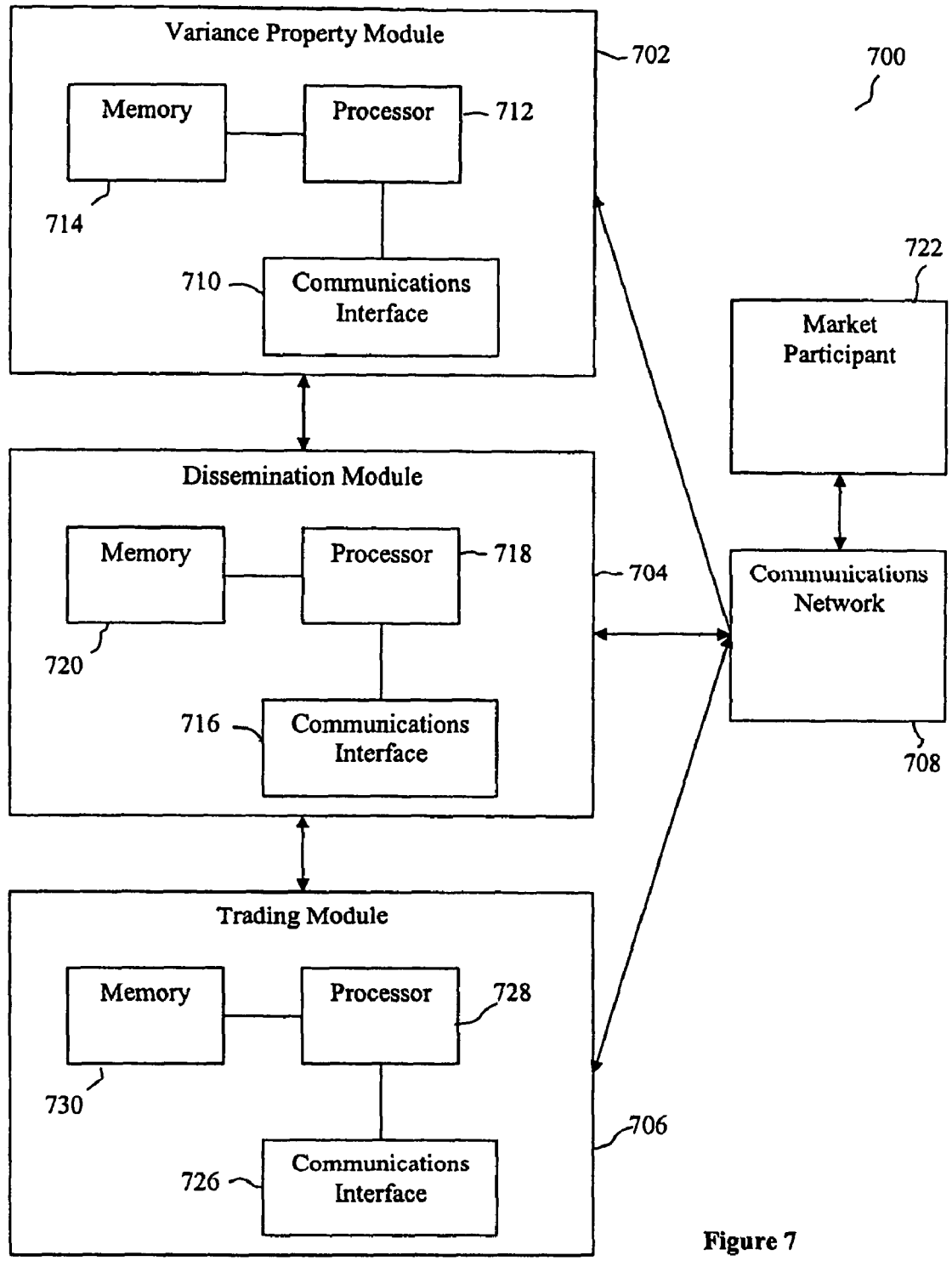
FIG. 7 is a block diagram of a system for creating and trading variance option contracts.

FIG. 7 is a block diagram of a system 700 for creating and trading variance option contracts. Generally, the system comprises a variance property module 702, a dissemination module 704 coupled with the variance property module 702, and a trading module 706 coupled with the dissemination module 704. Typically, each module 702, 706, 708 is also coupled to a communication network 708 coupled to various market participants 722.

The variance property module 702 comprises a communications interface 710, a processor 712 coupled with the communications interface 710, and a memory 714 coupled with the processor 712. Logic stored in the memory 714 is executed by the processor 712 such that that the variance property module 702 may receive current values for an underlying asset of a variance option contract through the communications interface 710; calculate realized variance, as described above, for the underlying asset; and pass the calculated realized variance the dissemination module 704.

The dissemination module 704 comprises a communications interface 716, a processor 718 coupled with the communications interface 716, and a memory 720 coupled with the processor 718. Logic stored in the memory 720 is executed by the processor 718 such that the dissemination module 704 may receive the calculated realized variance from the variance property module 702 through the communications interface 716, and disseminate the calculated realized variance over the communications network 708 to various market participants 722, as described above.

The trading module 706 comprises a communications interface 726, a processor 728 coupled with the communications interface 726, and a memory 730 coupled with the processor 728. Logic stored in the memory 730 is executed by the processor 728 such that the trading module 706 may receive buy or sell orders over the communications network 708, as described above, and pass the results of the buy or sell order to the dissemination module 704 to be disseminated over the communications network 708 to the market participants 722.

FIG. 8 is a table showing values for a variance option contract over a variance calculation period. In one example, a variance call option contract may have a strike price of 135.00 and be exercised at any time during the 90-day calculation period. Therefore, a holder of the variance call option contract could only exercise their option to make a profit during the 90-day variance calculation period when the cumulative realized variance is calculated to be above 135.00 such as on days 3-5 (804, 806, 808), 10 (810), 11 (812), 14 (814), 16 (816), 28 (818), 19 (820), 34-37 (822, 824, 826, 828), and 40 (830). On all other trading days of the variance calculation period, if the holder of the variance call option exercised their option it would result in a loss.

Similarly, in another example, a variance call option contract may have a strike price of 115.00 and only be exercised at the end of the 90-day calculation period. Therefore, due to the fact the cumulative realized variance is calculated to be above 115.00 at the end of the 90-day calculation period 831, the holder of the variance call option may exercise their option for a profit. However, if the cumulative realized variance was calculated to be at or below 115.00 at the end of the 90-day calculation period 831, the holder of the variance option may not exercise their option for a profit.

In yet another example, a variance put option contract may have a strike price of 117.00 and be exercised at any time during the 90-day calculation period. Therefore, a holder of the variance put option contract could only exercise their option to make a profit during the 90-day variance calculation period when the realized variance is calculated to be below 117.00 such as on days 1 (832), 2 (834), 8 (836), 9 (838), 24 (840), and 26 (842). On all other trading days of the variance calculation period, if the holder of the variance put option exercised their option it would result in a loss.

Similarly, in another example, a variance put option contract may have a strike price of 125.00 and only be exercised at the end of the 90-day calculation period 831. Therefore, due to the fact the cumulative realized variance is calculated to be below 125.00 at the end of the 90-day calculation period 844, the holder of the variance option contract may exercise their option for a profit. However, if the cumulative realized variance was calculation to be at or above 125.00 at the end of the cumulative calculation period 831, the holder of the variance option may not exercise their option for a profit.

According to another aspect of the present invention, chooser options may be created based on variance options. A chooser option is an option wherein the purchaser of the option buys a call or a put option at some time in the future. The call and the put option will typically share the same expiration date and the same strike price (value), although, split chooser options may be crafted wherein the call and the put options have different expirations and/or different strikes.

Chooser options are advantageous in situations in which investors believe that the price of the underlying asset is for a significant move, but the redirection of the move is in doubt. For example, some event, such as the approval (disapproval) of a new product, a new earnings report, or the like, may be anticipated such that positive news is likely cause the share price to rise, and negative news will cause the share price to fall. The ability to choose whether an option will be a put or a call having knowledge of the outcome of such an event is a distinct advantage to an investor.

The purchase of a chooser option is akin to purchasing both a put and a call option on the same underlying asset. Typically the chooser option is priced accordingly. In the present case, purchasing a variance chooser option amounts to buying both a put and a call option based on the variance of an underlying asset. Chooser options may be traded on an exchange just like other variance derivative. The only accommodations necessary for adapting an exchange for trading chooser options is that a final date for making the choice between a call option and a put option must be established and maintained. Also, post trade processing on the exchange's systems must be updated to implement and track the choice of the call or a put once the choice has been made. One option for processing the chosen leg of a chooser option is to convert the chooser option into a standard option contract according to the standard series for the same underlying asset and having the same strike price as the chosen leg of the chooser option.

It is intended that, except for terms explicitly defined in the specification, the foregoing detailed description should be regarded as illustrative rather than limiting, and that it should be understood that it is the following claims, including all equivalents, that are intended to define the spirit and scope of this invention.

The invention claimed is:

1. A computer-implemented method of calculating and disseminating a value of an underlying asset associated with at least one variance derivative, the method comprising:
    calculating, with a processor, a value for a statistical property reflecting the variance of the underlying asset on a processor, the value for the statistical property having a value which reflects an average volatility of price returns of the underlying asset over a predefined time period, wherein calculating the value for the statistical property reflecting the variance of the underlying asset comprises calculating an average of a summation of each squared daily return of the underlying asset;
    displaying, with the processor, at least one variance derivative based on the statistical property reflecting variance on a trading facility display device coupled to a trading platform;
    transmitting, with the processor, at least one variance derivative quote of a liquidity provider from the trading facility to at least one market participant; and
    settling, with the processor, the at least one variance derivative based on a difference between a first cumulative realized variance and a strike price set at a fixed second cumulative realized variance, wherein the strike price is set at the fixed second cumulative realized variance when the variance derivative is created;
    wherein calculating the value for the statistical property reflecting the variance of the underlying asset comprises:
        calculating the value of the statistical property according to the formula:

$$\text{Variance} = AF * \sum_{i=1}^{N_a-1} \frac{R_i^2}{N_e - 1}$$

wherein:

$$R_i = \ln \frac{P_{i+1}}{P_i}$$

$P_i$ is an initial value of the underlying asset used to calculate a daily return, $P_{i+1}$ is a final value of the underlying asset used to calculate the daily return, $N_e$ is a number of expected underlying asset values needed to calculate daily returns during a variance calculation period, $N_a$ is an actual number of underlying asset values used to calculate daily returns during the variance calculation period; and AF is an annualization factor.

2. The method of claim 1 wherein calculating the value of the statistical property reflecting the variance of the underlying asset comprises:
    removing the squared deviation of a daily return of the underlying asset that corresponds to a market disruption event.

3. The method of claim 1, further comprising:
    executing trades for the variance derivative by matching bids and offers to buy and sell positions in variance derivatives.

4. The method of claim 1, wherein the underlying asset is selected from the group consisting of: commodity or structured products traded on a trading facility or over-the-counter market; equity indexes or securities; fixed income indexes or securities; foreign currency exchange rates; interest rates; and commodity indexes.

5. The method of claim 1, wherein at least one of the at least one variance derivative is a variance option contract.

6. The method of claim 1, wherein at least one of the at least one variance derivative is a variance futures contract.

7. The method of claim 6, further comprising:
    calculating the cumulative realized variance of the variance futures contract on a processor, wherein the cumulative realized variance is an average of the value of the statistical property during a variance calculation period of the variance futures contract up to a current date;
    displaying the cumulative realized variance on the trading facility display device; and
    transmitting the cumulative realized variance from the trading facility to at least one market participant.

8. The method of claim 7, further comprising:
    calculating an implied realized variance of the variance futures contract according to the formula:

$$\text{Implied Variance} = \frac{TP - RV * \frac{Day_{Current}}{Day_{Total}}}{Day_{Left} / Day_{Total}},$$

wherein TP is a last trading price of the variance futures contract; RV is the cumulative realized variance; $Day_{Current}$ is a total number of trading days that have passed in the variance calculation period; $Day_{Total}$ is a total number of trading days in the variance calculation period; and $Day_{Left}$ is a number of trading days left in the variance calculation period;
    displaying the implied realized variance on the trading facility display device; and
    transmitting the implied realized variance from the trading facility to at least one market participant.

9. The method of claim 6, wherein the variance futures contract has a set expiration date.

10. The method of claim 1, wherein the trading platform is an open outcry platform.

11. The method of claim 1, wherein the trading platform is an electronic platform.

12. The method of claim 1, wherein the trading platform is a hybrid of an open outcry platform and an electronic platform.

13. The method of claim 1, further comprising:
    transmitting the at least one variance derivative quote from the trading facility over at least one dissemination network.

14. The method of claim 13, wherein the dissemination network is the Options Price Reporting Authority.

15. The method of claim 1, wherein the trading facility is an exchange.

16. The method of claim 1, wherein the liquidity provider is selected from the group consisting of: Designated Primary Market Makers ("DPM"), market makers, locals, specialists, trading privilege holders, members, and a registered trader.

17. The method of claim 1, wherein the market participant is selected from the group consisting of: a liquidity provider, a brokerage firm, and a normal investor.

18. The method of claim 1, wherein a variance derivative of the at least one variance derivative is a chooser variance derivative where a buyer of the chooser variance derivative may choose after purchase of the chooser variance derivative whether the chooser variance derivative is a call option or a put option.

19. A computer-implemented method of calculating and disseminating a value of an underlying asset associated with derivatives, the method comprising:
choosing, with a processor, at least one underlying asset to be a base of a variance derivative;
calculating, with the processor, a value of a statistical property reflecting the variance of the at least one underlying asset, the value for the statistical property having a value which reflects an average volatility of price returns of the at least one underlying asset over a variance calculation period;
removing, with the processor, each squared deviation of a daily return of the at least one underlying asset that corresponds to a market disruption event;
displaying, with the processor, variance derivatives based on the value of the statistical property on a trading facility display device coupled to a trading platform; and
settling, with the processor, the variance derivatives based on a difference between a first cumulative realized variance and a strike price set at a fixed second cumulative realized variance, wherein the strike price is set at the fixed second cumulative realized variance when the variance derivative is created;
wherein calculating the value of the statistical property reflecting the variance of the at least one underlying asset comprises:
calculating the value of the statistical property according to the formula:

$$\text{Variance} = AF * \sum_{i=1}^{N_a-1} \frac{R_i^2}{N_e - 1}$$

wherein:

$$R_i = \ln\frac{P_{i+1}}{P_i}$$

$P_i$ is an initial value of the underlying asset used to calculate a daily return, $P_{i+1}$ is a final value of the underlying asset used to calculate the daily return, $N_e$ is a number of expected underlying asset values needed to calculate daily returns during a variance calculation period, $N_a$ is an actual number of underlying asset values used to calculate daily returns during the variance calculation period; and AF is an annualization factor.

20. The method of claim 19, further comprising:
transmitting at least one variance derivative quote over a dissemination network to at least one market participant.

21. The method of claim 19, wherein the value of the statistical property reflecting the variance of the at least one underlying asset is calculated in real time.

22. The method of claim 19, wherein the at least one underlying asset is selected from the group consisting of: commodity or structured products traded on a trading facility or over-the-counter market; equity indexes or securities; fixed income indexes or securities; foreign currency exchange rates; interest rates; and commodity indexes.

23. The method of claim 19, wherein the trading platform is an open outcry platform.

24. The method of claim 19, wherein the trading platform is an electronic platform.

25. The method of claim 19, wherein the trading platform is a hybrid of an open outcry platform and an electronic platform.

26. The method of claim 19 wherein one of the variance derivatives is a variance futures contract.

27. The method of claim 19 wherein one of the variance derivatives is a variance option contract.

28. The method of claim 19, wherein the market participant is a market participant selected from the group consisting of: a liquidity provider, a brokerage firm, and a normal investor.

29. The method of claim 19, wherein the trading facility is an exchange.

30. The system of claim 19, where the variance derivatives are chooser variance derivatives where a buyer of a first chooser derivative of the chooser variance derivatives may choose after purchase of the first chooser derivative whether the chooser variance derivative is a call option or a put option.

31. A system for calculating and disseminating a value of an underlying asset associated with a variance derivative, the system comprising:
a variance property module comprising a first processor, a first memory coupled with the first processor, and a first communications interface coupled with a communications network, the first processor, and the first memory;
a dissemination module coupled with the variance property module, the dissemination module comprising a second processor, a second memory coupled with the second processor, and a second communications interface coupled with the communications network, the second processor, and the second memory;
a first set of logic, stored in the first memory and executable by the first processor to receive current values for an underlying asset of a variance derivative through the first communications interface; calculate, based on a calculated value of a statistical property reflecting a variance of the underlying asset, a realized variance, cumulative realized variance, and implied realized variance for the underlying asset; and pass values for the calculated realized variance, cumulative realized variance, and implied realized variance to the dissemination module; and
a second set of logic, stored in the second memory and executable by the second processor to receive the calculated realized variance, cumulative realized variance, and implied realized variance values for the underlying asset from the variance property module; and disseminate the calculated values through the second communications interface to at least one market participant;
wherein the variance derivative is settled based on a difference between the cumulative realized variance and a strike price set at a fixed second cumulative realized variance, wherein the strike price is set at the fixed second cumulative realized variance when the variance derivative is created; and wherein the calculated value of the statistical property reflecting the variance of the underlying asset is calculated according to the formula:

$$\text{Variance} = AF * \sum_{i=1}^{N_a-1} \frac{R_i^2}{N_e - 1}$$

wherein:

$$R_i = \ln\frac{P_{i+1}}{P_i}$$

$P_i$ is an initial value of the underlying asset used to calculate a daily return $P_{i+1}$ is a final value of the underlying asset used to calculate the daily return, $N_e$ is a number of expected underlying asset values needed to calculate daily returns during a variance calculation period, $N_a$ is an actual number of underlying asset values used to calculate daily returns during the variance calculation period; and AF is an annualization factor.

32. The system of claim 31, further comprising:
a trading module coupled with the dissemination module, the trading module comprising a third processor, a third memory coupled with the third processor, and a third communications interface coupled with the communications network, the third processor, and the third memory;
a third set of logic, stored in the third memory and executable by the third processor, to receive at least one buy or sell order over the communications network; execute the buy or sell order; and pass a result of the buy or sell order to the dissemination module; and
a fourth set of logic, stored in the second memory and executable by the second processor to receive the result of the buy or sell order from the trading module and disseminate the result of the buy or sell order through the second communications network to the at least one market participant.

33. The system of claim 31, wherein the variance derivative is a chooser variance derivative where a buyer of the chooser variance derivative may choose after purchase of the chooser variance derivative whether the chooser variance derivative is a call option or a put option.

* * * * *